United States Patent
Harmon et al.

(10) Patent No.: US 6,942,034 B2
(45) Date of Patent: Sep. 13, 2005

(54) EXTENT OF DETONATION DETERMINATION METHOD USING SEISMIC ENERGY

(75) Inventors: Jerald L. Harmon, Sugar Land, TX (US); William T. Bell, Huntsville, TX (US)

(73) Assignee: Geo-X Systems, Ltd., Calgary (CA)

( * ) Notice: Subject to any disclaimer, the term of this patent is extended or adjusted under 35 U.S.C. 154(b) by 238 days.

(21) Appl. No.: 10/354,677

(22) Filed: Jan. 30, 2003

(65) Prior Publication Data

US 2003/0168213 A1 Sep. 11, 2003

Related U.S. Application Data

(60) Provisional application No. 60/353,121, filed on Feb. 1, 2002.

(51) Int. Cl.[7] ............................................. E21B 43/119
(52) U.S. Cl. ................. 166/297; 166/55.2; 166/250.01; 166/250.11
(58) Field of Search ............................... 166/55.2, 249, 166/250.01, 250.11, 297

(56) References Cited

U.S. PATENT DOCUMENTS

| | | | |
|---|---|---|---|
| 3,717,844 A | 2/1973 | Barrel et al. | |
| 3,878,502 A | 4/1975 | Rochelle | |
| 3,914,732 A | 10/1975 | Brumleve et al. | |
| 4,051,907 A | 10/1977 | Estes | |
| 4,147,222 A | 4/1979 | Patten et al. | |
| 4,281,403 A | 7/1981 | Siems et al. | |
| 4,807,200 A | 2/1989 | Montes et al. | |
| 5,550,787 A | 8/1996 | Rialan et al. | |
| 5,627,798 A | 5/1997 | Siems et al. | |
| 6,002,640 A | 12/1999 | Harmon | |
| 6,263,283 B1 * | 7/2001 | Snider et al. | 702/6 |
| 6,308,137 B1 | 10/2001 | Underhill et al. | |
| 6,564,866 B2 * | 5/2003 | Clark et al. | 166/250.12 |

FOREIGN PATENT DOCUMENTS

| | | |
|---|---|---|
| GB | 1 206 967 | 9/1970 |
| GB | 2 057 733 A | 4/1981 |

\* cited by examiner

Primary Examiner—Zakiya Walker
(74) Attorney, Agent, or Firm—W. Allen Marcontell

(57) ABSTRACT

A method of determining the extent of detonation of a Well Perforating Gun is disclosed. The Perforating Gun is positioned in a borehole and the detonation is initiated at one point on the essentially curvilinear array of explosive charges. Seismic waves emanate from the series of explosions, propagate away from the Perforating Gun and are detected at a distance away from the Perforating Gun using seismic receivers consisting of single or arrayed transducers of conventional design. The seismic receivers may be placed at or near the earth's surface and/or in one or more boreholes. The recorded seismic waves are processed and analyzed, and may be decomposed through a novel inversion process. The combined results are further analyzed to determine the extent of detonation including whether the gun fired or not, and if there was a misfire or partial misfire, the quantitative extent of the detonation.

75 Claims, 34 Drawing Sheets

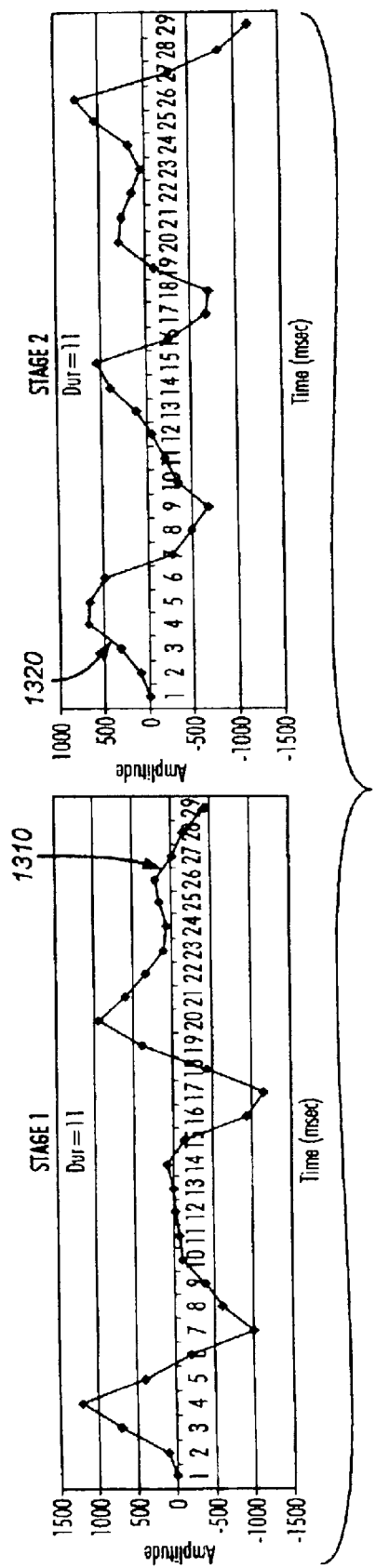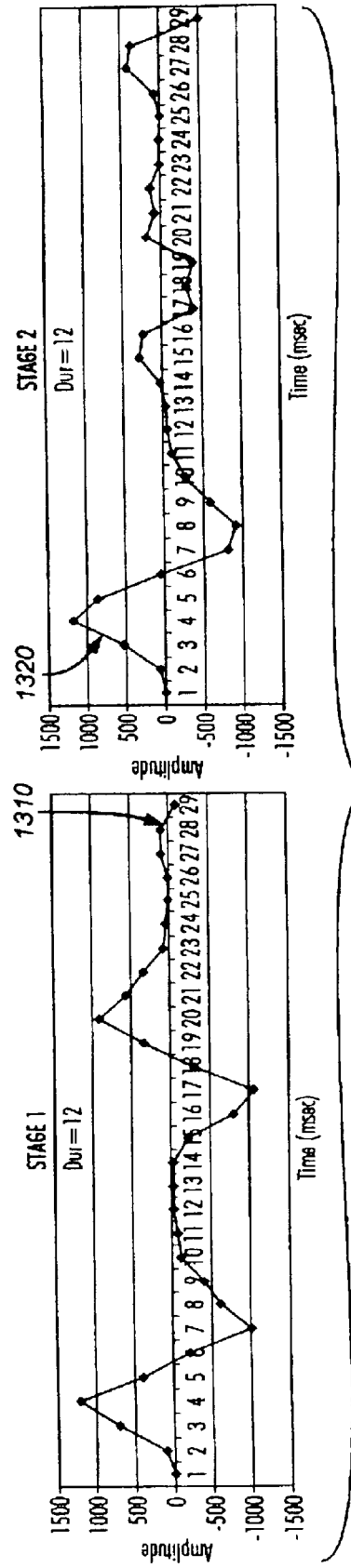
FIG. 13a
FIG. 13b

| Adjustment Factors | f= | | 0.000 | -0.001 | -0.004 | -0.008 | -0.016 | -0.027 | -0.040 | -0.057 | -0.077 |
|---|---|---|---|---|---|---|---|---|---|---|---|
| Actual Duration is | 13 msec | | 1 | 2 | 3 | 4 | 5 | 6 | 7 | 8 | 9 |
| Pulse | Time | Composite | | | DURATION OF THE DETONATION IS ASSUMED TO BE | | | | | | |
| 100 | 0 | 100 | 100 | 100 | 100 | 100 | 100 | 100 | 100 | 100 | 100 |
| 700 | 1 | 800 | 800 | 700 | 700 | 700 | 700 | 700 | 700 | 700 | 700 |
| 1200 | 2 | 2001 | 2001 | 1901 | 1200 | 1200 | 1200 | 1200 | 1200 | 1200 | 1200 |
| 400 | 3 | 2404 | 2404 | 2304 | 1604 | 400 | 400 | 400 | 400 | 400 | 400 |
| -200 | 4 | 2212 | 2212 | 2112 | 1412 | 212 | -200 | -200 | -200 | -200 | -200 |
| -1000 | 5 | 1226 | 1226 | 1128 | 426 | -744 | -1144 | -1000 | -1000 | -1000 | -1000 |
| -600 | 6 | 645 | 645 | 545 | -155 | -1355 | -1755 | -1555 | -600 | -600 | -600 |
| -400 | 7 | 267 | 267 | 167 | -533 | -1733 | -2133 | -1933 | -933 | -400 | -400 |
| -100 | 8 | 192 | 192 | 92 | -608 | -1808 | -2008 | -2008 | -1008 | -408 | -100 |
| -52 | 9 | 158 | 158 | 58 | -642 | -1842 | -2242 | -2042 | -1042 | -442 | -42 |
| -25 | 10 | 162 | 162 | 62 | -638 | -1838 | -2238 | -2038 | -1038 | -438 | -38 |
| -13 | 11 | 183 | 183 | 83 | -617 | -1817 | -2217 | -2017 | -1017 | -417 | -17 |
| 0 | 12 | 183 | 183 | 83 | -617 | -1817 | -2217 | -2017 | -1017 | -417 | -17 |
| | 13 | -132 | -132 | -232 | -932 | -2132 | -2532 | -2332 | -1332 | -732 | -332 |
| | 14 | -1156 | -1156 | -1258 | -1956 | -3156 | -3556 | -3356 | -2356 | -1756 | -1356 |
| | 15 | -2336 | -2336 | -2436 | -3136 | -4336 | -4736 | -4536 | -3536 | -2936 | -2536 |
| | 16 | -2657 | -2657 | -2757 | -3457 | -4657 | -5057 | -1857 | -3857 | -3257 | -2857 |
| | 17 | -2183 | -2183 | -2283 | -2983 | -4183 | -4583 | -4383 | -3383 | -2783 | -2383 |
| | 18 | -1177 | -1177 | -1277 | -1977 | -3177 | -3577 | -3377 | -2377 | -1777 | -1377 |
| | 19 | -555 | -555 | -655 | -1355 | -2555 | -2955 | -2755 | -1755 | -1155 | -755 |
| | 20 | -196 | -196 | -296 | -996 | -2196 | -2596 | -2396 | -1396 | -796 | -396 |
| | 21 | -94 | -94 | -194 | -894 | -2094 | -2494 | -2294 | -1294 | -894 | -294 |
| | 22 | -36 | -36 | -136 | -836 | -2036 | -2436 | -2238 | -1236 | -636 | -238 |
| | 23 | -11 | -11 | -111 | -811 | -2011 | -2411 | -2211 | -1211 | -611 | -211 |
| | 24 | 0 | 0 | -100 | -800 | -2000 | -2400 | -2200 | -1200 | -600 | -200 |
| | 25 | 0 | 0 | -100 | -800 | -2000 | -2400 | -2200 | -1200 | -600 | -200 |
| | 26 | 0 | 0 | -100 | -800 | -2000 | -2400 | -2200 | -1200 | -600 | -200 |

*FIG. 19a*

| | -0.099 | -0.131 | -0.162 | 0.138 | 0.000 | 0.000 | 0.000 | 0.000 | 0.000 | 0.000 | 0.000 | 0.000 |
|---|---|---|---|---|---|---|---|---|---|---|---|---|
| | 10 | 11 | 12 | 13 | 14 | 15 | 16 | 17 | 18 | 19 | 20 | 21 |
| 13 MSEC | | | | | | | | | | | | |
| | 100 | 100 | 100 | 100 | 100 | 100 | 100 | 100 | 100 | 100 | 100 | 100 |
| | 700 | 700 | 700 | 700 | 700 | 700 | 700 | 700 | 700 | 700 | 700 | 700 |
| | 1200 | 1200 | 1200 | 1200 | 1200 | 1200 | 1200 | 1200 | 1200 | 1200 | 1200 | 1200 |
| | 400 | 400 | 400 | 400 | 400 | 400 | 400 | 400 | 400 | 400 | 400 | 400 |
| | -200 | -200 | -200 | -200 | -200 | -200 | -200 | -200 | -200 | -200 | -200 | -200 |
| | -1000 | -1000 | -1000 | -1000 | -1000 | -1000 | -1000 | -1000 | -1000 | -1000 | -1000 | -1000 |
| | -600 | -600 | -600 | -600 | -600 | -600 | -600 | -600 | -600 | -600 | -600 | -800 |
| | -400 | -400 | -400 | -400 | -400 | -400 | -400 | -400 | -400 | -400 | -400 | -400 |
| | -100 | -100 | -100 | -100 | -100 | -100 | -100 | -100 | -100 | -100 | -100 | -100 |
| | -62 | -62 | -62 | -62 | -62 | -62 | -62 | -62 | -62 | -62 | -62 | -62 |
| | 62 | -25 | -25 | -25 | -25 | -25 | -25 | -25 | -25 | -25 | -25 | -25 |
| | 83 | 145 | -13 | -13 | -13 | -13 | -13 | -13 | -13 | -13 | -13 | -13 |
| | 83 | 145 | 170 | 0 | 0 | 0 | 0 | 0 | 0 | 0 | 0 | 0 |
| | -232 | -170 | -145 | -132 | -100 | -100 | -100 | -100 | -100 | -100 | -100 | -100 |
| | -1256 | -1194 | -1169 | -1158 | -1158 | -700 | -700 | -700 | -700 | -700 | -700 | -700 |
| | -2436 | -2374 | -2349 | -2338 | -2338 | -2236 | -1200 | -1200 | -1200 | -1200 | -1200 | -1200 |
| | -2757 | -2695 | -2670 | -2657 | -2657 | -2557 | -1857 | -400 | -400 | -400 | -400 | -400 |
| | -2283 | -2221 | -2196 | -2183 | -2183 | -2083 | -1383 | -183 | 200 | 200 | 200 | 200 |
| | -1377 | -1215 | -1190 | -1177 | -1177 | -1077 | -377 | 823 | 1223 | 1000 | 1000 | 1000 |
| | -855 | -593 | -568 | -555 | -555 | -455 | -255 | 1445 | 1845 | 1645 | 600 | 600 |
| | -296 | -234 | -209 | -196 | -196 | -96 | 604 | 1804 | 2204 | 2004 | 1004 | 400 |
| | -194 | -132 | -107 | -94 | -94 | 6 | 706 | 1906 | 2306 | 2106 | 1106 | 506 |
| | -136 | -74 | -49 | -36 | -36 | 64 | 764 | 1964 | 2364 | 2164 | 1164 | 564 |
| | -111 | -49 | -24 | -11 | -11 | 89 | 789 | 1989 | 2389 | 2189 | 1189 | 589 |
| | -100 | -38 | -13 | 0 | 0 | 100 | 800 | 2000 | 2400 | 2200 | 1200 | 600 |
| | -100 | -38 | -13 | 0 | 0 | 100 | 800 | 2000 | 2400 | 2200 | 1200 | 600 |
| | -100 | -38 | -13 | 0 | 0 | 100 | 800 | 2000 | 2400 | 2200 | 1200 | 600 |
| | -100 | -38 | -13 | | | 100 | 800 | 2000 | 2400 | 2200 | 1200 | 600 |

| 0.000 | 0.000 | 0.000 | 0.000 | 0.000 | 0.000 | 0.000 | 28 msec | | PULSE | Time | If Dur = 13 Final Pulse | 1920 Estimate |
|---|---|---|---|---|---|---|---|---|---|---|---|---|
| 22 | 23 | 24 | 25 | 26 | 27 | 28 | | 100 PULSE | 100 | 0 | 100 | 100 |
| 100 | 100 | 100 | 100 | 100 | 100 | 700 | | 700 | 700 | 1 | 700 | 700 |
| 700 | 700 | 700 | 700 | 700 | 700 | 1200 | | 1200 | 1200 | 2 | 1200 | 1200 |
| 1200 | 1200 | 1200 | 1200 | 1200 | 1200 | 400 | | 400 | 400 | 3 | 400 | 400 |
| 400 | 400 | 400 | 400 | 400 | 400 | -200 | | -200 | -200 | 4 | -200 | -200 |
| -200 | -200 | -200 | -200 | -200 | -200 | -1000 | | -1000 | -1000 | 5 | -1000 | -1000 |
| -1000 | -1000 | -1000 | -1000 | -1000 | -1000 | -600 | | -600 | -600 | 6 | -600 | -600 |
| -600 | -600 | -600 | -600 | -600 | -600 | -400 | | -400 | -400 | 7 | -400 | -400 |
| -400 | -400 | -400 | -400 | -400 | -400 | -100 | | -100 | -100 | 8 | -100 | -100 |
| -100 | -100 | -100 | -100 | -100 | -100 | -62 | | -62 | -62 | 9 | -62 | -62 |
| -62 | -62 | -62 | -62 | -62 | -62 | -25 | | -25 | -25 | 10 | -25 | -25 |
| -25 | -25 | -25 | -25 | -25 | -25 | -13 | | -13 | -13 | 11 | -13 | -13 |
| -13 | -13 | -13 | 13 | -13 | -13 | 0 | | 0 | 0 | 12 | 0 | 0 |
| 0 | 0 | 0 | 13 | 0 | 0 | -100 | | -100 | 0 | 13 | 0 | 0 |
| -100 | -100 | -100 | | | | -1200 | | -1200 | 0 | 14 | 0 | 0 |
| -700 | -700 | -700 | | | | -400 | | -400 | 0 | 15 | 0 | 0 |
| -1200 | -1200 | -1200 | | | | 200 | | 200 | 0 | 16 | 0 | 0 |
| -400 | -400 | -400 | | | | 1000 | | 1000 | 0 | 17 | 0 | 0 |
| 200 | 200 | 200 | | | | 800 | | 800 | 0 | 18 | 0 | 0 |
| 1000 | 1000 | 1000 | | | | 400 | | 400 | 0 | 19 | 0 | 0 |
| 800 | 800 | 800 | | | | 100 | | 100 | 0 | 20 | 0 | 0 |
| 400 | 400 | 400 | | | | 62 | | 62 | 0 | 21 | 0 | 0 |
| 100 | 62 | 62 | 62 | 62 | 62 | 25 | | 25 | 0 | 22 | 0 | 0 |
| 164 | 89 | 25 | 25 | 25 | 25 | 13 | | 13 | 0 | 23 | 0 | 0 |
| 189 | 100 | 38 | 13 | 13 | 13 | 0 | | 0 | 0 | 24 | 0 | 0 |
| 200 | 100 | 38 | 13 | 0 | 0 | 0 | | | | 25 | | 0 |
| 200 | 100 | 38 | | 0 | 0 | | | | | 26 | | 0 |
| 200 | 100 | 38 | | | | | | | | 27 | | 0 |

1910 → (column 27 marker); 1900 → (row marker)

|  |  |  |  |  |  |  |
|---|---|---|---|---|---|---|
| A1 | B1 | C1 | D1 | E1 | F1 | G1 |
| A2 | B2 | C2 | D2 | E2 | F2 | G2 |
| A3 | B3 | C3 | D3 | E3 | F3 | G3 |
| A4 | B4 | C4 | D4 | E4 | F4 | G4 |
| A5 | B5 | C5 | D5 | E5 | F5 | G5 |
| A6 | B6 | C6 | D6 | E6 | F6 | G6 |
| A7 | B7 | C7 | D7 | E7 | F7 | G7 |

| Duration Table | | | |
|---|---|---|---|
|  | Gun Segment | Travel Time | Duration |
| Top | 1 | 1000.0 msec | 0 msec |
|  | 2 | 1000.5 | 0.9 |
|  | 3 | 1001.0 | 1.8 |
|  | 4 | 1001.5 | 2.7 |
|  | 5 | 1002.0 | 3.6 |
|  | 6 | 1002.5 | 4.5 |
|  | 7 | 1003.0 | 5.4 |
|  | 8 | 1003.5 | 6.3 |
|  | 9 | 1004.0 | 7.2 |
|  | 10 | 1004.5 | 8.1 |
|  | 11 | 1005.0 | 9 |
|  | 12 | 1005.5 | 9.9 |
|  | 13 | 1006.0 | 10.8 |
|  | 14 | 1006.5 | 11.7 |
|  | 15 | 1007.0 | 12.6 |
|  | 16 | 1007.5 | 13.5 |
|  | 17 | 1008.0 | 14.4 |
| Bottom | 18 | 1008.5 | 15.3 |

FIG. 23

EXTENT OF DETONATION DETERMINATION METHOD USING SEISMIC ENERGY

CROSS-REFERENCE TO RELATED APPLICATIONS

This application is related to U.S. Provisional Application Ser. No. 60/353,121 filed Feb. 1, 2002 and claims the priority rights and privileges of that application.

STATEMENT REGARDING FEDERALLY SPONSORED RESEARCH OR DEVELOPMENT

Not Applicable.

BACKGROUND OF THE INVENTION

Those in the petroleum industry are particularly concerned with extracting petroleum by boring holes into deep underground rock formations. To improve the flow of hydrocarbon fluids into the borehole from the surrounding rock, explosive devices are placed in the borehole and detonated, causing piercement and fracturing of the rock. These explosive devices are called Perforating Guns and contain a series of shaped charges, each with a primer connected by explosive cord called detonating cord. The detonating cord is also connected within the Perforating Gun to a detonator. The explosion is initiated by the detonator and travels along the detonating cord and past the series of shaped charges, detonating each of them in turn, to the last shaped charge in the Perforating Gun. In a successful detonation, all of the shaped charges explode. Occasionally, the explosion sequence will terminate before all of the charges have detonated, against the desire and intent of the operator. In a worst case, none of the explosive charges will detonate even though the operator has activated the firing sequence.

In the current state of the industry's technology, no method is available to the operator that can quickly and reliably provide a quantitative estimate of the extent of the detonation of the Perforating Gun. A quantitative estimate of extent of detonation would be one that provides the operator with the length of the Perforating Gun that detonated or a percentage of the total length of the Perforating Gun that detonated. At best, the operator may get an indication of a probable firing of the gun from a transducer positioned on the well structure at or near the well head. Presumably, the absence of a signal indicates a total misfire. This method often fails to give correct indications of gun firing or misfiring, as the case may be. Moreover, this wellhead transducer method provides neither an indication of a partial misfire nor a quantitative estimate of the extent of detonation.

Tubing-conveyed Perforating Guns (TCP Guns) are typically detonated below the packer and are intended to be permanently left in place as petroleum production ensues after detonation. In the case of TCP the operator thus may never learn from retrieval and direct inspection of the gun that a partial detonation has occurred. He may suffer direct economic loss in that the productive rock formation is only partially perforated and petroleum production from the perforated borehole is correspondingly reduced. A potentially far greater economic loss may stem from the operators resultant under-estimation of the production potential of the oil field, based on the lower production rate after a partial perforation that he believes to be a complete perforation of the formation. Under-estimation of the field's potential could lead to a wrong decision such as to limit further drilling activity or even to abandon the field and the initial investment in that field.

Other types of Perforating Guns may be retrieved to the surface for inspection after attempted detonation. The operator will be able to observe the extent of detonation upon inspection. Even in this method of operation it would be useful for the operator to know, without waiting for withdrawal or inspection, the extent of detonation. If the operator knew immediately of a failed detonation he could undertake appropriate remedial action as best available. Backup detonation means could be activated if available. Knowledge of the existence of unexploded charges could allow the operator to implement procedures designed to enhance safety of workers in this situation.

Direct sensing of the detonation at the location of the gun itself is impractical in the case of TCP operations, in that no wire or cable can be conveniently connected to the Perforating Gun.

Thus, there is a need in the petroleum industry for a method of indirect remote sensing of the detonation with a rapid and reliable determination of the extent of detonation of a Perforating Gun.

SUMMARY OF THE INVENTION

A preferred embodiment of the invention is a set of seismic receivers, a seismic recording and control system linked to the Perforating Gun detonation control system and containing a computer programmed to process and analyze the seismic wave amplitudes enabling the practitioner to determine the extent of detonation of a subsurface borehole-emplaced Perforating Gun.

The seismic receivers consist of conventional geophones or other transducers deployed singly or in arrays or sub-arrays of multiple transducers. Emplacement of the seismic receivers may be at or near the earth's surface or in boreholes proximate the vicinity of the Perforating Gun positioned to allow advantage in sensing and processing the directly arriving seismic waves from the Perforating Gun.

The Perforating Gun may be positioned as necessary to achieve its purpose at any depth within a borehole and may be of any practicable length or style of construction. It may be detonated by any of the available means. The detonation is assumed to be initiated by a detonator and to progress away from the position of the detonator as it travels along the gun.

The axis of the borehole may be vertical, horizontal, linear, or curved, i.e. of any curvilinear shape.

Seismic waves caused by the progressive explosion travel in all directions and arrive at the seismic receivers. Amplitudes of the seismic waves are detected, recorded and then processed to improve the signal-to-noise ratio and form a best signal estimate. A control and processing computer activates the recording prior to the instant of detonation, enabled to do so by a link to the detonation control system. The link may be an automated electronic link or may simply be voice communication between human operators of the seismic recorder and the detonation system.

The best signal estimate is analyzed and a determination is made of the extent-of-detonation (EOD) of the Perforating Gun, i.e. whether the Perforating Gun fired successfully, partially misfired or totally misfired, and in the case of a partial misfire, the quantitative extent of detonation of the gun. The determination may include comparison of the best signal estimate to predicted signal based on modeling and/or to signal estimates from other detonations. The determination may also include an application of novel inversion algorithms and further analysis to best quantify the extent of detonation. In all of these approaches the determination relies upon predetermined potentials of the perforating gun.

The process can be performed rapidly and results provided on site so as to make the result available to the operator soon after the detonation.

BRIEF DESCRIPTION OF THE DRAWINGS

For a more detailed description of the preferred embodiment of the present invention, reference will now be made to the accompanying drawings, wherein;

FIG. 19 shows a table of successive steps in the first stage of inversion and the second stage of inversion of a modeled Composite Wavelet for a curvilinear borehole.

FIG. 23 shows a table of values of Duration and Travel Time versus Gun Segment.

DETAILED DESCRIPTION OF THE PREFERRED EMBODIMENT

Figure 1:
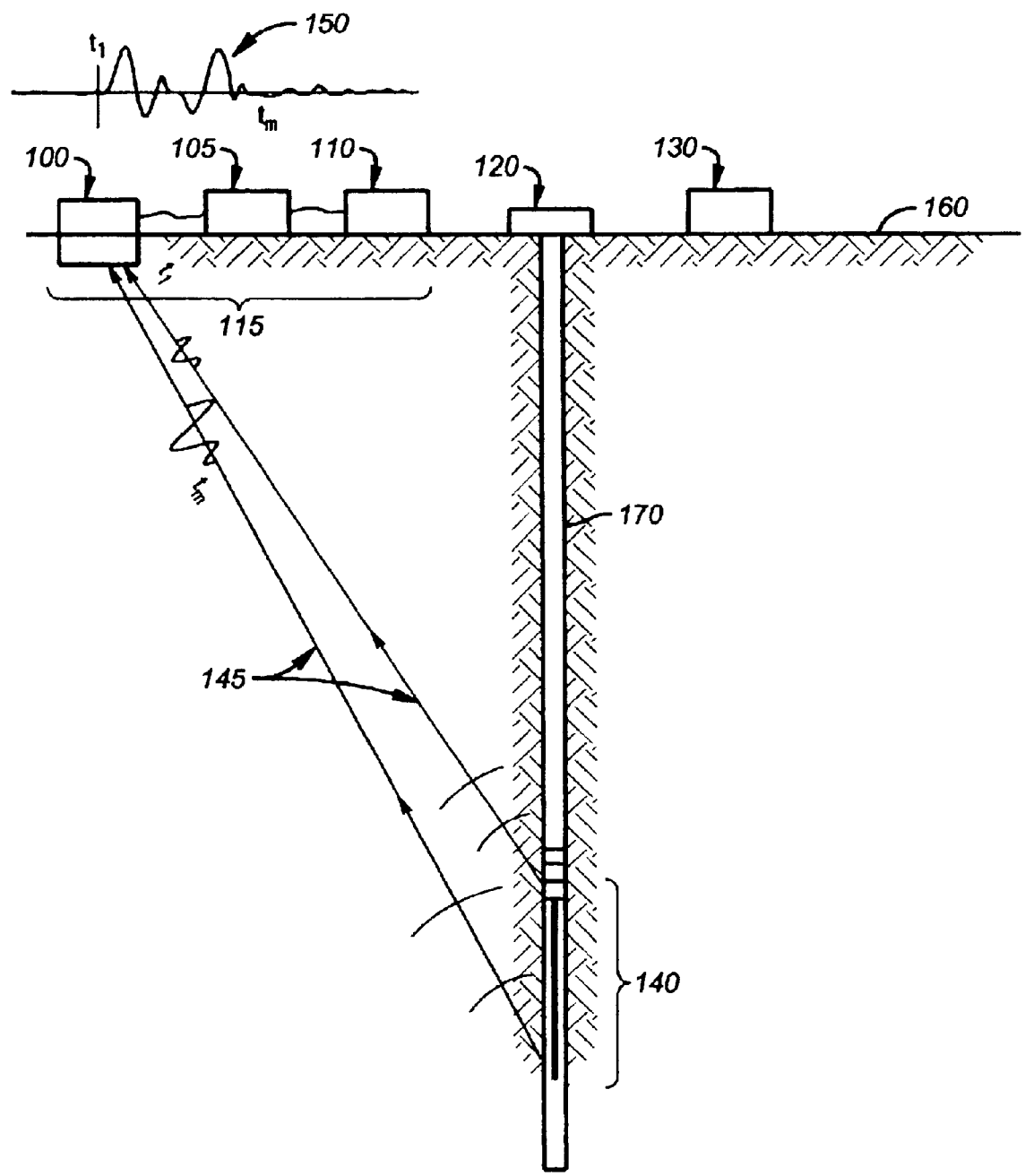
FIG. 1 is a cut-away view of a rock formation showing a well bore and system elements as well as a Composite Wavelet received at the surface from the detonation of a Perforating Gun.

Referring to FIG. 1, a number of seismic sensors 100 are shown in position at or near the earth's surface 160 and connected to a signal processor and recorder 105. This unit 105 is further linked to the extent of detonation (EOD) controller 110. This controller 110 controls all of the equipment that is unique to this invention. Together these three subsystems make up the complete EOD system 115. The remainder of the equipment in FIG. 1 comprises items that are normally used in the business of drilling, perforating, completing and producing petroleum from boreholes. The borehole and borehole equipment 170 are shown connected to wellhead apparatus 120. A Perforating Gun 140 is shown positioned in the borehole, ready for detonation.

When the Perforating Gun is ready to be detonated, the perforation operator notifies the seismic observer, who activates the EOD system. The EOD system then begins to record seismic data, received by the seismic sensors 100 and then processed and digitized in the signal processor and recorder 105. The EOD system continues to record and store data in memory and on media (such as tape) until the seismic energy caused by the explosion of the Perforating Gun has abated.

Seismic ray paths 145 are shown on FIG. 1 to indicate the approximate travel path of seismic waves from the Perforating Gun 140 to the seismic sensors 100. These ray paths are not perfectly straight lines as shown in FIG. 1 but will be bent as they pass through layers of earth with differing seismic wave velocities and are refracted. The amplitude versus time graph 150, called the Composite Wavelet, represents the seismic amplitude received at the seismic sensors 100 and recorded and processed digitally. Generally the amplitudes prior to reception of the energy from the detonation of the Perforating Gun 140 will be small if seismic noise level is low, the early amplitudes of the seismic waves emanating from the detonation will be relatively high and they will gradually subside after a few hundred milliseconds (msec) to lower levels, eventually dying out after some seconds and leaving only seismic noise again.

The seismic noise is defined herein to be the combination of ambient noise, i.e. seismic waves from uncontrolled external sources, such as caused by wind and traffic, and seismic waves resulting from the perforating gun detonation (gun-generated noise), but other than signal waves, i.e. the direct arrivals through the earth from the perforating gun itself. For purpose of determination of the extent-of-detonation of the perforating gun, signal is defined as these directly arriving seismic waves, the Composite Wavelet 150. Thus any other seismic waves caused directly or indirectly by the perforating gun detonation process are considered to be a component of seismic noise. Examples of such gun-generated noise components are seismic waves caused by movement of the equipment in the borehole and at the well head, when such movement is caused by the detonation, and seismic waves traveling from the perforating gun to the sensors by indirect paths that include reflection from impedance boundaries (but not reverberations). Reverberations, defined as short-period multiple reflection energy following the direct arrival events, contribute energy to the source wavelet and are considered to be signal for the purpose of extent-of-detonation determination. Signal will ordinarily be compressional wave energy only, because it will generally be better separated from gun-generated seismic noise than other modes due to its early arrival. However, in principal, signal could also be shear wave or other modes of directly arriving seismic energy.

Figure 2:
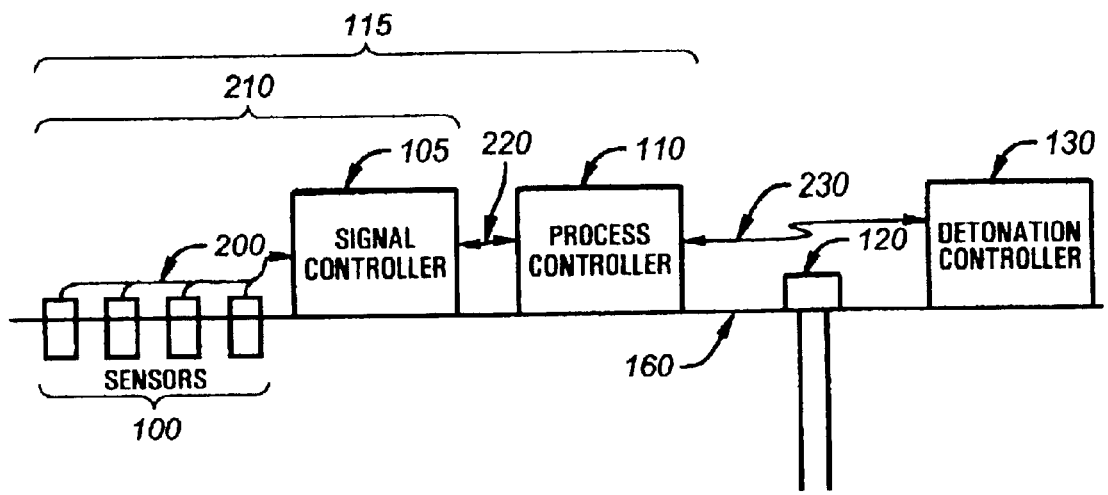
FIG. 2 is a view of a portion of the preferred embodiment as positioned at or near the earth's surface.

FIG. 2 provides further detail of the EOD system 115. The seismic sensors 100 are linked together and connected to the signal processor 105 by a surface seismic cable 200. The sensors may be commercially available geophones and/or hydrophones, hydrophones being suitable if the area is water covered. The sensors may be at the ground surface or may be buried to improve coupling and to reduce ambient noise. The sensors may also be emplaced in shallow boreholes. The geophones may be vertical and/or horizontal geophones, i.e. able to sense vertical or horizontal motion of the earth. The geophones may be 3-component geophones, that sense three orthogonal components of motion. A combination of all four sensors, one vertical sensor, two horizontal sensors and a pressure-sensitive sensor or hydrophone may also be used (called 4C sensor). In water-saturated environments hydrophones may be used as the sole type of sensor. Any type of transducer or sensing apparatus capable of sensing variations in pressure or ground motion is potentially suitable for the EOD purpose.

Figure 4:
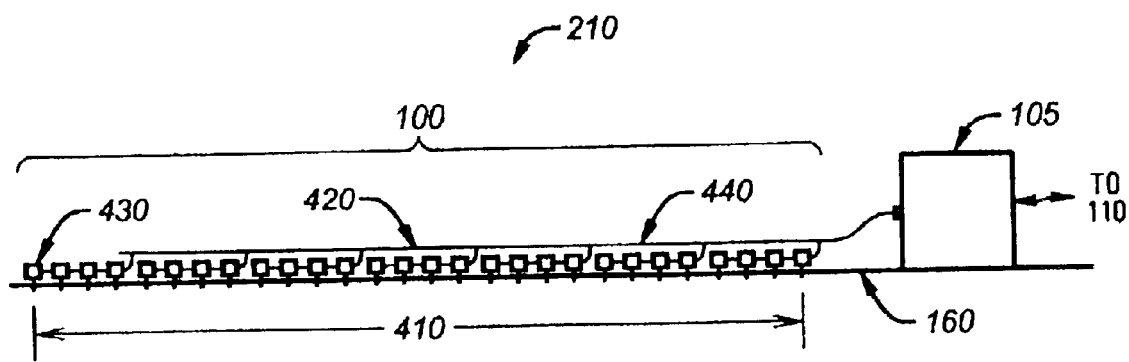
FIG. 4 is a schematic view of the seismic receiver at the surface of the earth.

FIG. 4 shows surface seismic sensors 100 emplaced at the surface in a one-dimensional array with four geophones per sub-array and 7 sub-arrays comprising the total seismic array aperture 410. The geophones in the sub-arrays may be combined additively, to improve the signal-to-noise ratio, preferably with individual time shifts to align the signal prior to combination, or they may be combined using other array-processing algorithms. Multiple arrays of various sensor types, each consisting of multiple sub-arrays may be utilized. Diversity stacking, adaptive noise editing, adaptive filtering, coherency filtering, Weiner filtering, and other methods exploiting the multiple sensor sub-arrays and arrays, that sample the signal waves and noise waves, may be employed to improve the signal estimate. If desired, more sub-arrays with suitable two-dimensional or three-dimensional geometric design may be utilized to provide greater redundancy of channels with desired signal and noise characteristics to facilitate the signal-to-noise ratio enhancement through array processing. For example the sub-arrays could be emplaced over a rectangular area in a two-dimensional array with 7 sub-arrays inline and 7 sub-arrays cross-line for a total of 49 sub-arrays. With appropriate processing a better signal estimate would result from this augmentation of the sampling effort. The employment of these multiple sub-arrays, arrays and processing techniques may be viewed as an effort to obtain the best possible representation of the true Composite Wavelet.

However under ideal conditions a single sensor could be used rather than the more elaborate approach described above, and this would be preferred for cost reasons. With experience, the practitioner can decide what level of effort will provide the desired degree of result quality.

The resultant signal estimate, the best available representation of the ideal noise-free Composite Wavelet 150, is subjected to analysis and further mathematical processing to yield determinations of whether the gun fired or misfired, whether there was a partial misfire, and if there was a partial misfire, the quantitative extent of detonation of the perforating gun.

The connecting cable 200 may be replaced by a radio linkage to the signal processor and recorder 105 to provide an equivalent method of transferring the seismic data. Another equivalent method is to record data at each sensor or group of sensors and later transmit or transfer it to the central signal processor and recorder 105.

Figure 3:
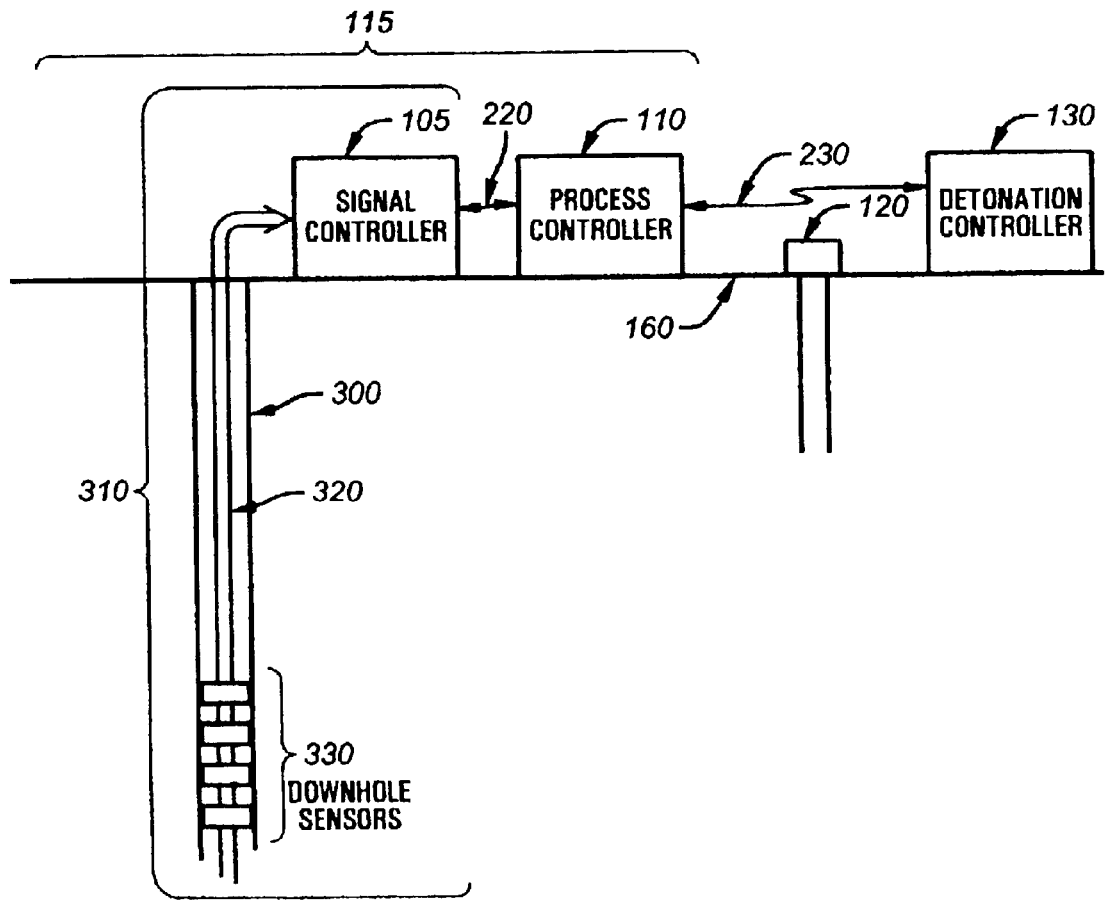
FIG. 3 is a view of the portion of the preferred embodiment with seismic receivers deployed in a deep borehole.

An alternative method of configuring the EOD system 115 is presented in FIG. 3. Instead of or in addition to placing the seismic sensors at the surface they are positioned in a deep borehole 300. This borehole may either be the same borehole 170 as contains the Perforating Gun 140 or it may be a different but adjacent borehole. The downhole seismic sensors 330 may be connected to each other and up the borehole to the surface and to the signal processor and recorder 105 by a downhole cable 320. Alternatively they may store their information for later retrieval. In this adaptation the seismic wave recordings may be retrieved from the downhole seismic sensors after they are returned to the surface, or information may be transmitted to the surface by other available methods such as EM or borehole pressure wave telemetry. Similarly to the application of surface sensor sub-arrays, multiple downhole sensors may be combined using a wide range of processing techniques, as described for surface sensors, to enhance the signal-to-noise ratio of the signal estimate. The downhole sensors may not be distributed areally but instead limited to emplacement along a borehole. However, downhole sensors may be deployed in multiple boreholes. As in the case for the surface sensors, the best combined signal estimate is subjected to further analysis and processing to determine the success, partial success, or failure of the detonation and to quantify the extent-of-detonation.

Figure 5:
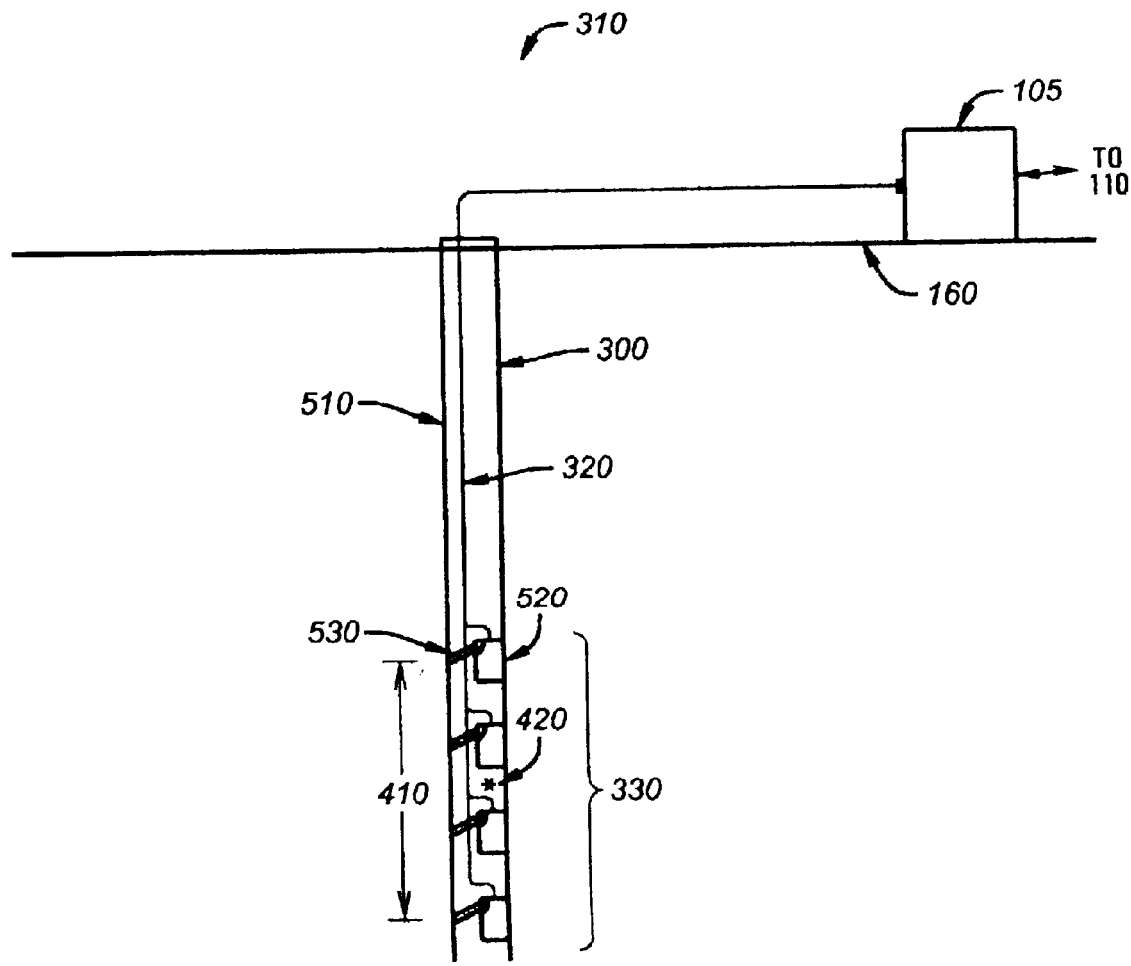
FIG. 5 is a schematic view of the seismic receiver positioned in a borehole.

FIG. 5 shows details of the downhole seismic sensors 330 as they are deployed for use. Individual geophones are contained in cases that have locking arms that may be actuated. These locking arms serve to press the sensor against the wall of the borehole or casing to improve the coupling of the sensor to the earth. Downhole geophones in this configuration are in conventional use in the industry. Alternatively, other types of downhole seismic sensors may be employed such as hydrophones. Multi-component geophones may be combined with pressure-sensitive sensors, just as in the surface sensor method.

Because the seismic sensors may be placed closer to the explosion if a borehole is used, a means of improving the signal-to-noise ratio of the seismic data is available via the downhole method, relative to the surface method. Closer emplacement provides higher seismic energy levels and more high frequency signal, but also simplifies the seismic ray path geometry of the seismic energy arriving at the sensors, which is beneficial to the methods of this invention. Another advantage of downhole emplacement is that the ambient noise level will generally be much lower than at the earth surface. Militating against the downhole sensor emplacement strategy however is the cost of deploying the sensors. This cost is generally significantly greater than the cost of surface deployment. A compromise solution is to place sensors at a shallow depth in boreholes or to simply bury the sensors just below the surface For both surface and downhole emplacement of sensors, the practitioner should consider the effect that gun-generated noise may have on the directly arriving signal events. Positioning of the sensors at a distance such that gun-generated noise events do not arrive simultaneously with signal events may require in some cases that a minimum distance from the well head be maintained, or in the case of borehole sensors, that a minimum distance from the perforating gun to the sensors be maintained. This is because high velocity waves traveling up the borehole may interfere, or may excite secondary noise modes at or near the well-head, that can interfere with the directly arriving waves that travel through the earth. Experience will provide a guide as to when such conditions will exist. The solution is to place the sensors beyond this critical minimum distance.

Figure 6:
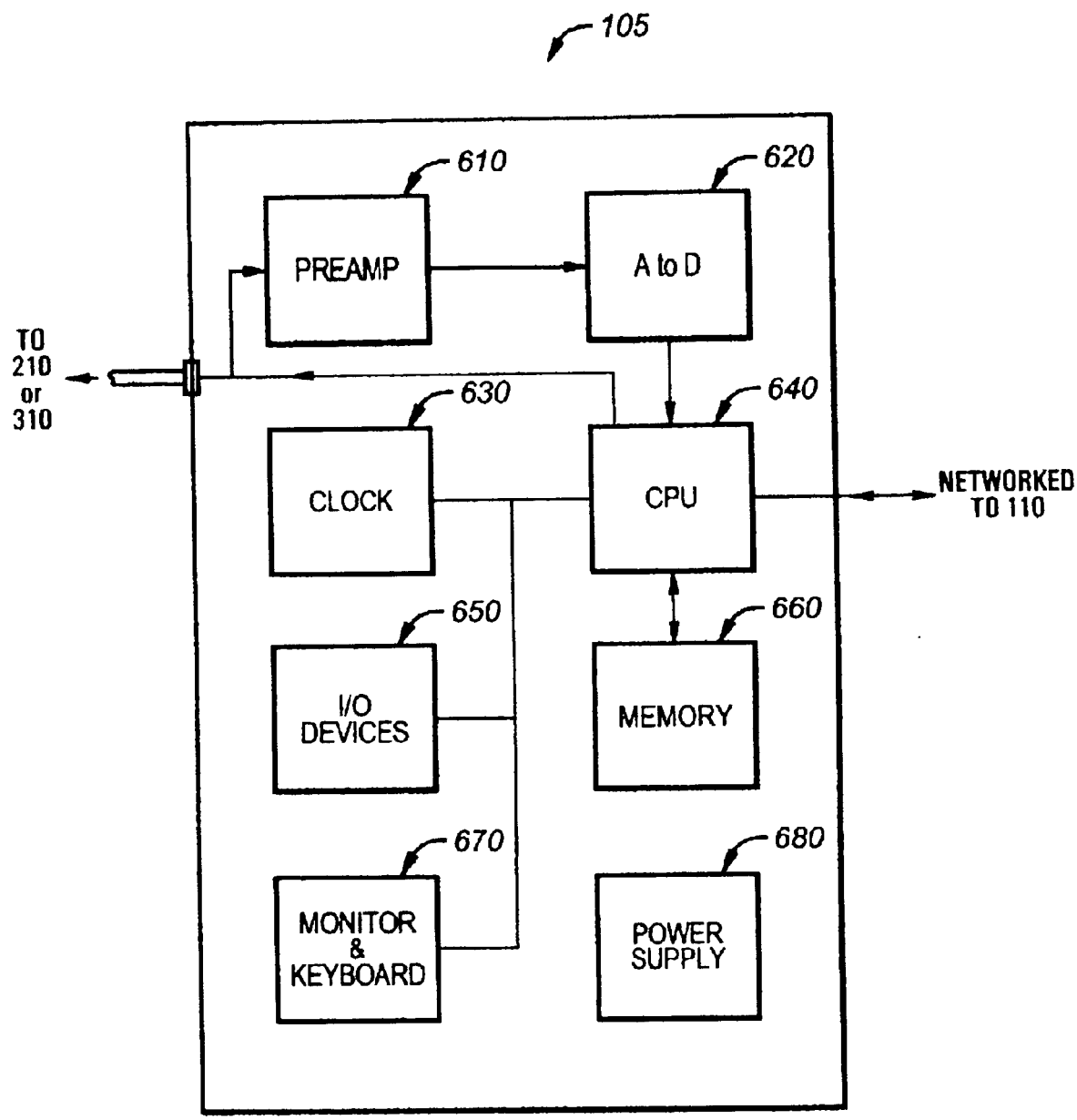
FIG. 6 is a depiction of the signal processor showing its essential elements.
Figure 7:
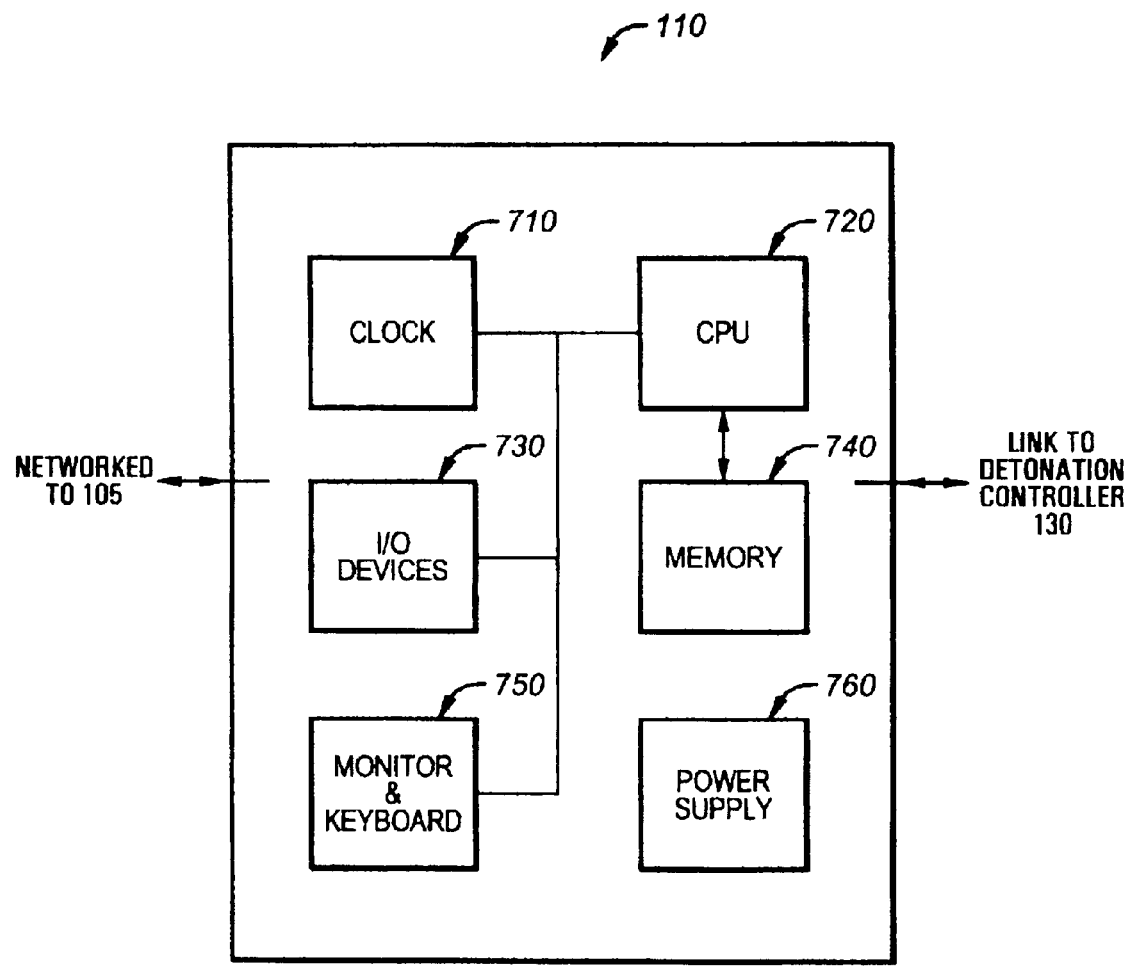
FIG. 7 is a schematic view of the process controller.

FIG. 6 shows the elements of the signal processor and recorder 105 and FIG. 7 shows the EOD controller. Both of these devices are essentially computers of commercially available types. All of the hardware components are of familiar type and commercially available. The software and method of use of the EOD controller provide the uniqueness of the system.

Referring to FIG. 6, seismic signals are input to the device 105 via cable 100 or 300. These may be analog, as assumed in the present figure, or may be digital having been digitized at or in proximity to the seismic sensors. In the later case commands may be sent from the CPU 640 to the online devices controlling the sensors. If the seismic signals are brought to the device 105 in analog form as electrical voltages in the cable, a pre-amplifier 610 amplifies and conditions the signal prior to analog-to-digital conversion in the A/D converter 620. Digitized seismic amplitudes are stored in memory and may be written to physical media such as tape by I/O devices 650. Other standard subsystems of the device 105 include power supply 680, monitor and keyboard 670 and clock 630. The system elements shown for the signal processor and recorder 105 are present in integrated form in commercially available PC-based seismic data acquisition systems such as the ARAM ARIES system manufactured by Geo-X Systems Ltd.

A second computer system is shown in FIG. 7 and is designated as the EOD controller 110. It is networked or otherwise connected to the signal processor and recorder 105 as indicated in the FIG. 7 or it may be interfaced solely by the physical media recorded by the device 105 and control information provided to device 105 by the EOD controller 110 via physical media.

The EOD controller 110 includes standard types devices as shown: a CPU 720, memory 740, clock 710, I/O devices 730, monitor and keyboard 750 and power supply 760. It is shown as linked to the detonation controller 130. The detonation controller may be any means for detonating or controlling the detonation of the Perforating Gun 140. It may be contained in a single device located in the proximity of the wellhead and in communication with the Perforating Gun assembly in borehole. Alternatively, the detonation controller 130 may be a cooperative assembly of numerous devices located at both, the well surface and downhole e.g. physically coupled to the Perforating Gun. The EOD controller may utilize any type of physical, electronic or electrical linkage, or it may include a communication linkage effected by radio, cell phone or other means. The purpose of the linkage is to alert the seismic observer so that he may activate the seismic recording at the correct time just prior to the detonation of the Perforating Gun and to allow general coordination of well activity and seismic activity.

The signal processor and recorder 105 may be combined with the EOD controller 110 so that only one computer instead of two are required to carry out the required activities, as an alternative and equivalent implementation of the method.

Figure 8:
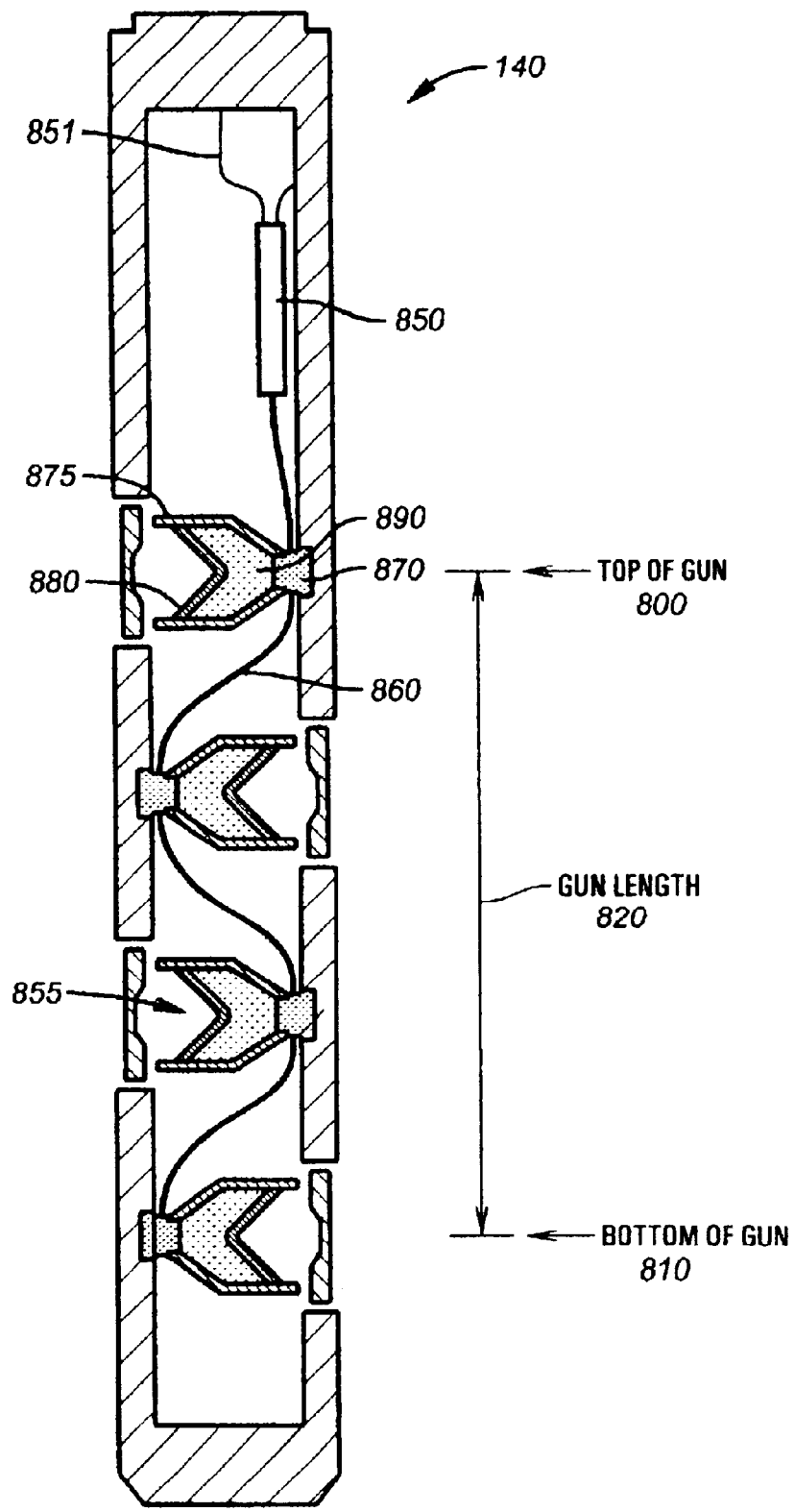
FIG. 8 is a schematic view of a section of the Perforating Gun.

The Perforating Gun 140 is shown in FIG. 8. Essential elements of this include the electrical wire connected at the top of the gun to the detonator 850; the detonating cord 860, and a series of shaped charges 855. Each shaped charge 855 is provided with a primer explosive charge 870, a case 875, a liner 880, and a main explosive charge 890.

Although only four shaped charges are depicted in FIG. 8, normally many more would be contained in a Perforating Gun of the lengths commonly utilized. The Perforating Gun sections are manufactured such that total gun assembly lengths varying from a few feet to many hundreds of feet may be achieved. The shaped charges will typically be uniformly spaced over the entire length of the active portion of the gun assembly with less than 1 ft separation between charges. In perforating guns designed to perforate multiple zones with intervening zones to be left un-perforated, there will be portions of the gun with no shaped charges.

Normal practice is to have the detonator 850 positioned at the upper end of the gun assembly as shown so that detonation is initiated at the upper end. In this case the detonation will progress from the detonator along the detonating cord 860 to successively lower points along the detonating cord until the detonation ceases. Each primer explosive charge 870 will be caused to detonate by the detonating cord as the detonation front reaches it, unless a misfire occurs. The detonation of the primer explosive charge 870 will cause the main explosive charge 890 of its shaped charge 855 to detonate.

If the detonation front progresses along the gun without interruption as intended, each successive shaped charge will be detonated in turn, until the last shaped charge, furthest from the detonator 850, explodes, completing the detonation process.

If the detonator 850 fails to detonate when the operator attempts to detonate it, a 'total misfire' of the Perforating Gun occurs. If the detonator detonates, but a misfire interrupts the progression of the detonation front along the detonating cord before the last shaped charge is detonated, a 'partial misfire' occurs. If all shaped charges detonate including the furthest shaped charge from the detonator, a 'complete firing' or 'successful firing' occurs.

Several types of Perforating Gun assemblies are available in the industry and various methods of firing Perforating Guns are provided by the industry practitioners. The method of this invention is not limited to any particular type of Perforating Gun assembly or method of detonation, but can work effectively so long as the detonation is initiated at one point at either the top or bottom of the gun and progresses along the gun from that point.

FIG. 8 indicates three critical parameters of the Perforating Gun: these are the position deemed the "top of the gun" 800, the "bottom of the gun" 810" and the "Gun Length" 820. The "top of the gun" is defined as the position of the center of the uppermost shaped charge along the borehole axis. The "bottom of the gun" is the position of the center of the lowermost shaped charge within the borehole. Both of these positions are defined in terms of X, Y and Z coordinates of three-dimensional space with the Perforating Gun positioned ready for detonation. The "Gun Length" is the distance along the borehole axis between the "top of the gun" and "bottom of the gun".

Similarly, the position of the seismic receiver is given by the coordinates in three dimensions of the geometric center of the seismic sensor array aperture 420.

Figure 9:
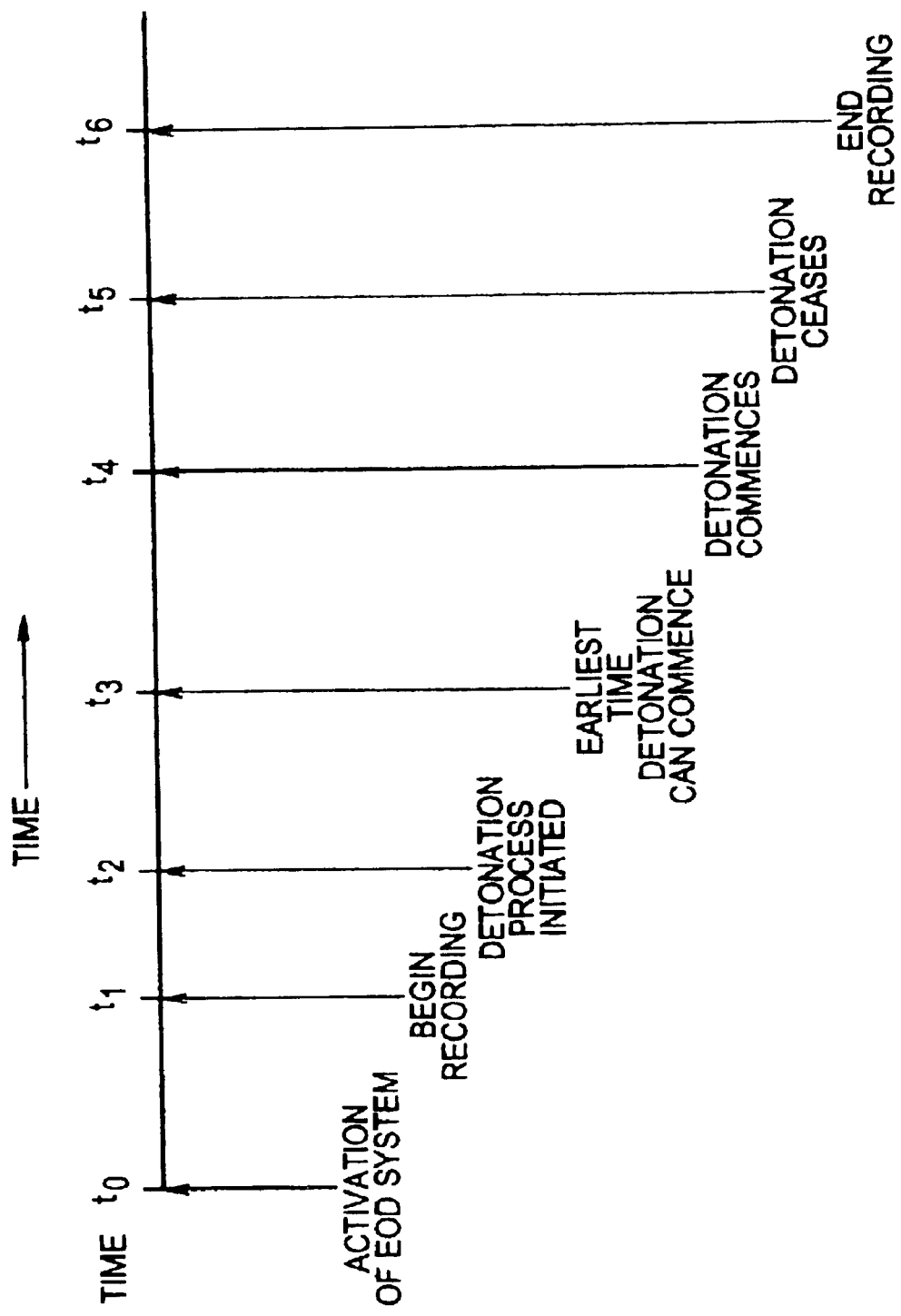
FIG. 9 is a time-line of the detonation and recording process.

FIG. 9 shows the sequence of steps that take place when the perforation operator notifies the seismic observer of his intent to commence detonation at a specified time. The seismic observer activates the EOD system 115 (FIG. 1) at time $t_0$, having already deployed the seismic sensors and tested all of the subsystems. Prior to the earliest possible time of the detonation commencement $t_3$ he causes the signal processor and recorder 105 to begin to record seismic data, and the recording continues from this time $t_1$ onward to $t_6$. The perforation operator takes action at time $t_2$ to initiate the detonation process as required by the particular type of perforation system and according to the schedule that has been communicated to the seismic observer. Sometime later (at $t_4$) the detonation commences, i.e. the detonator 850 detonates. The amount of delay between initiation of the detonation process and the instant of detonation commencement is variable depending on the type of firing system and control system used. In any case the seismic recording process must be initiated prior to detonation and continue some time after the detonation of the Perforating Gun ceases at $t_5$.

A unique feature of the method of this invention is that it is not a requirement that the time of detonation be known in order for the determination of the extent of detonation to succeed. Therefore no provision need be made to measure, determine or otherwise know that particular instant of time, the moment of detonation. This aspect simplifies the field implementation of the recording process because there does not have to be an electronic or electrical linkup between the detonation controller 130 and the EOD system 115.

However if there is a link between the gun firing system and the seismic recording system, or if both systems are equipped with or have access to accurate synchronized clocks or to external time signals such as from GPS satellites, so that the instant of detonation is known precisely, a secondary benefit may befall the practitioner. The knowledge of exact firing time allows the use of the perforating gun seismic recording as a single shot VSP (Vertical Seismic Profile) survey. Seismic surveys in the area may be calibrated with and tied to the detonation recording and further, to well geology, using this information and methods familiar to those skilled in the art. Referring to FIG. 1, if the Detonation Controller 130 controls an electrical firing system from the surface, it can be readily linked to the Process Controller 110. This would facilitate the use of the recorded data for this secondary purpose.

The amount of additional time that must be recorded depends on the distance between the seismic sensors and the Perforating Gun, the seismic velocity and other factors. Normally at least 20 seconds of data would be recorded after the latest expected time of detonation. Only the first few hundred msec of data including the first arrivals and their immediate aftermath are useful to the inversion process of this invention, however additional evidence of the detonation and even the extent of detonation of the Perforating Gun may be gleaned from data at times later than this. An example of this would be seismic energy caused by later movement of the gases in the borehole, the gases having been generated by the explosion. Such seismic energy may arrive by diverse non-direct paths to the seismic sensors and can be useful in ascertaining that the detonation did in fact occur.

Figure 10:
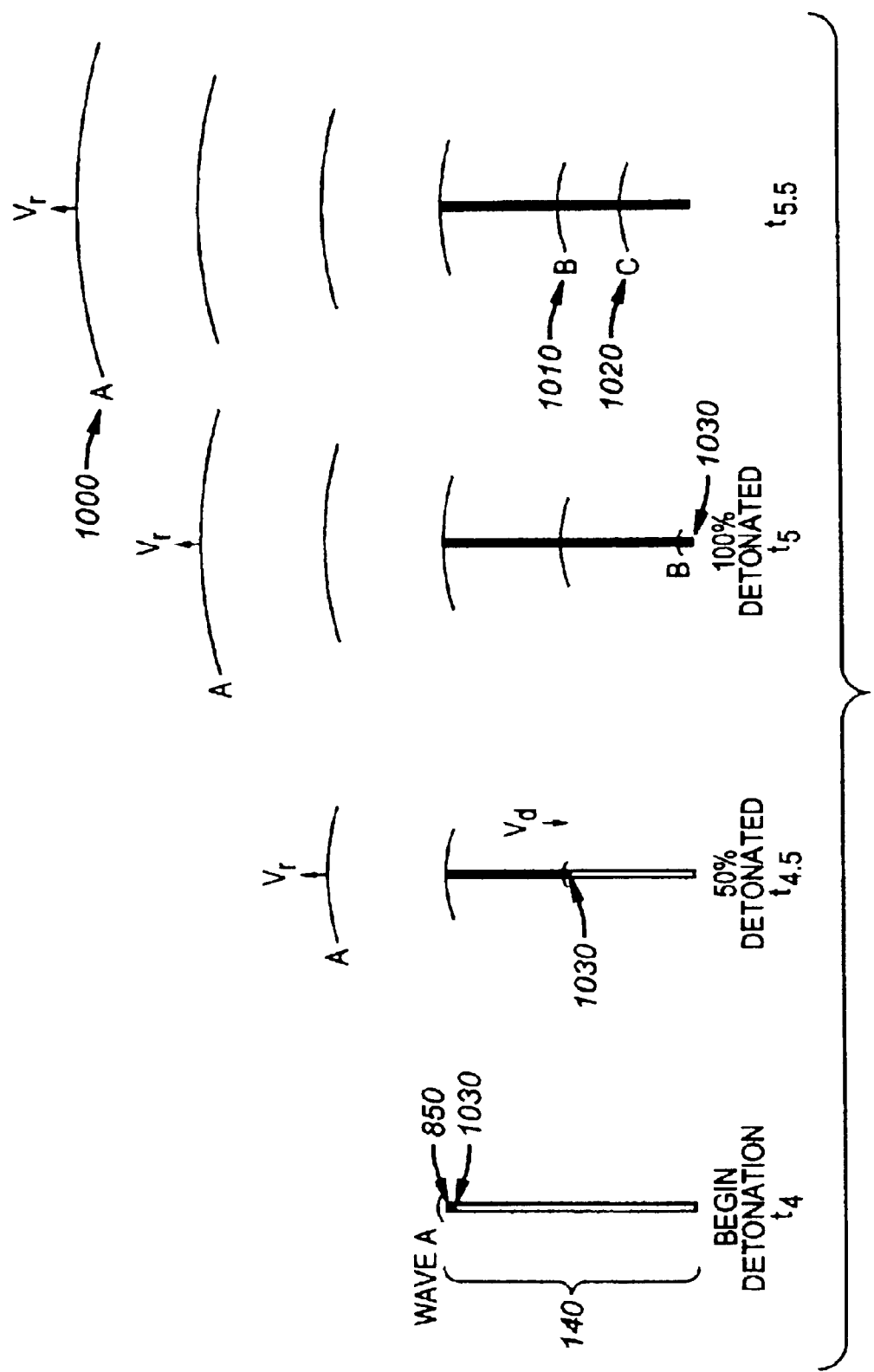
FIG. 10 depicts the successive stages of gun detonation and seismic energy propagation.
Figure 11A:
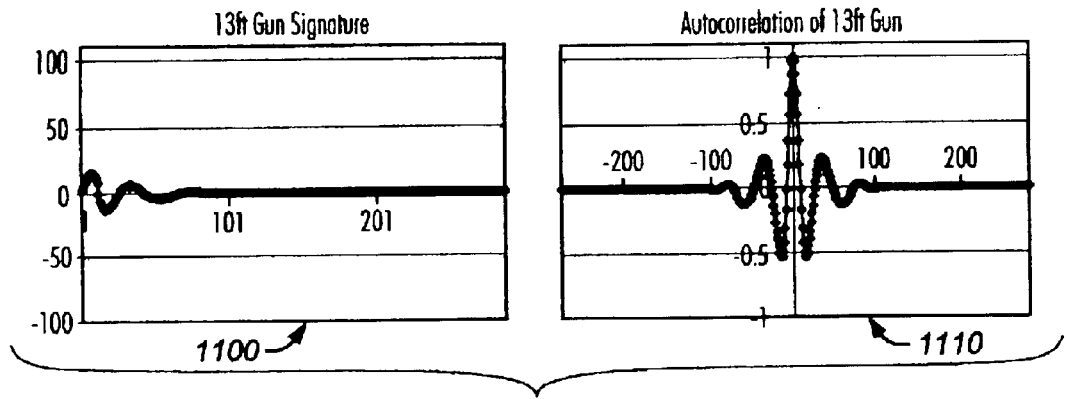
FIG. 11 illustrates modeled composite wave forms and autocorrelations for varying Gun Lengths.
Figure 11B:
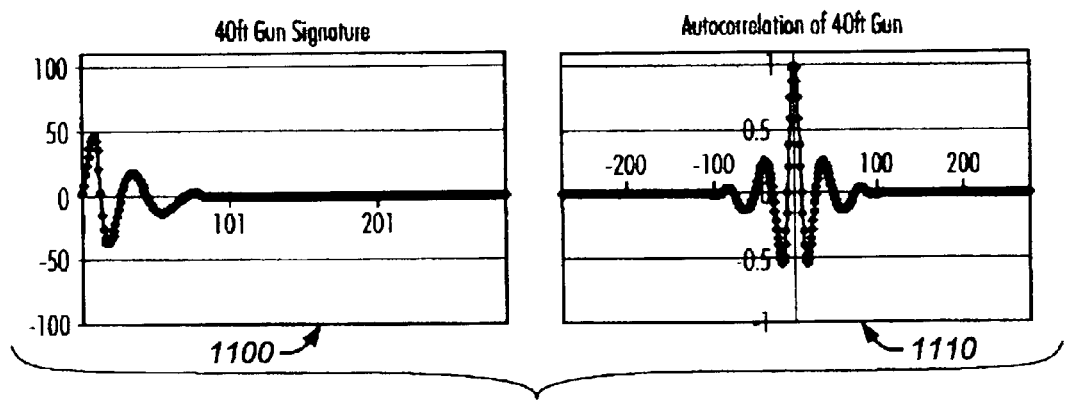
Figure 11C:
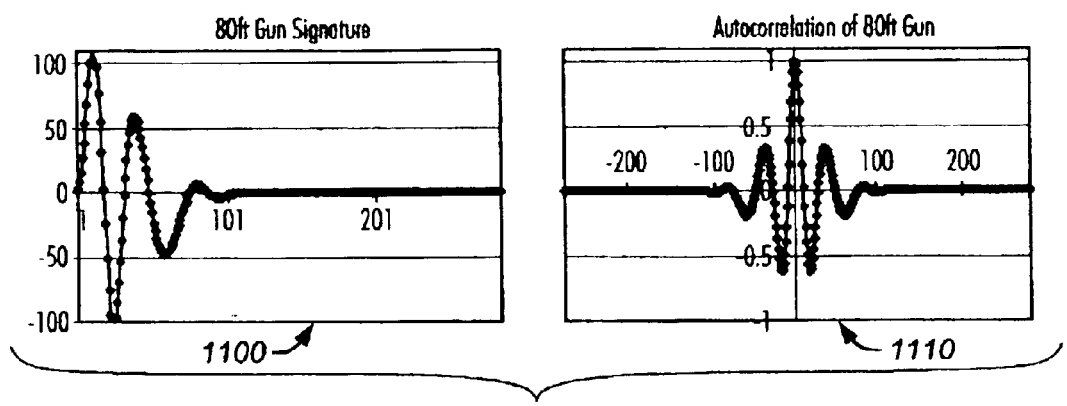
Figure 11D:
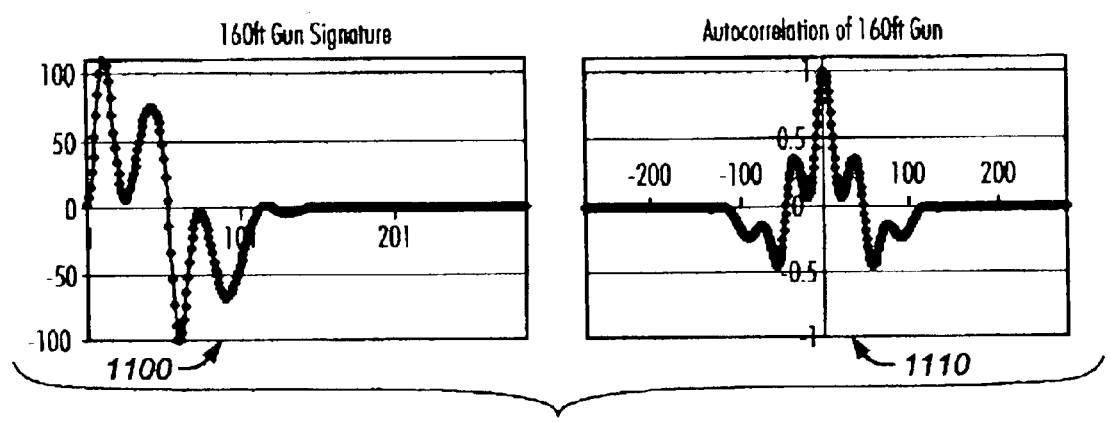
Figure 11E:
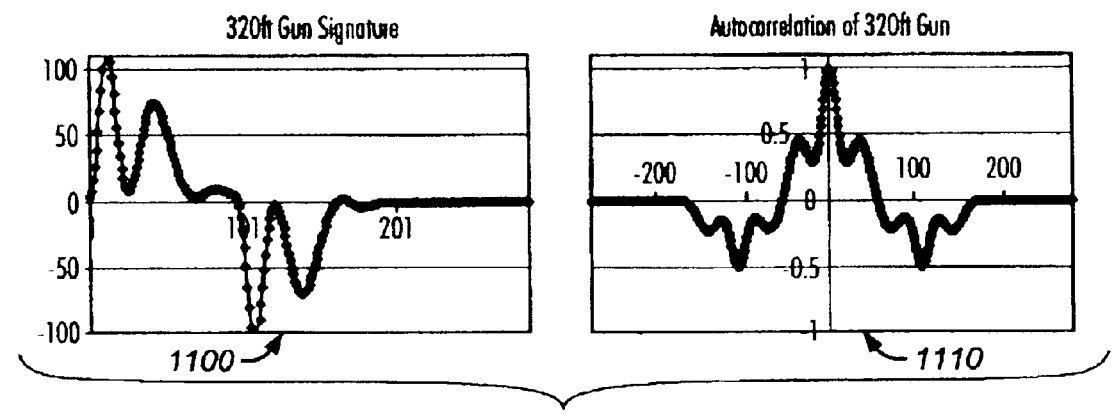

FIG. 10 illustrates in a cross-sectional view of the Perforating Gun 140 in the surrounding earth in four successive stages of detonation and seismic emanation from the gun. At $t_4$, as in the prior figure, detonation commences, at the top of the gun. Sometime later, at $t_{4.5}$ the detonation front 1030 has progressed 50% of the way along the gun to a position midway along the borehole axis between the top and the bottom of the gun. At time $t_5$ the detonation front 1030 has just initiated the detonation of the bottom-most shaped charge in the Perforating Gun. The detonation front 1030 travels along the axis of the Perforating Gun and the nearly co-located axis of the borehole itself, at a constant velocity $V_d$.

This detonation velocity $V_d$ is a characteristic of the particular design of the type of Perforating Gun chosen by the operator. It will have been measured in the laboratory and is a known quantity. A typical value for $V_d$ is 10 ft per msec. This is less than half of the velocity of detonation of the detonating cord 860 that carries the detonation front 1030. This reduction in velocity is due to the helical configuration of the detonating cord within the Perforating Gun as it descends from shaped charge to shaped charge, the shaped charges being located with orientations from 0 to 360 degrees around the Perforating Gun axis. Because the cord typically takes this indirect path along the gun axis the length of cord required may be more than twice the length of the Perforating Gun. This results in the significant lowering of the effective detonation velocity as measured along the gun axis, $V_d$, from the absolute detonation velocity along the cord itself, for typical Perforating Guns.

Certain Perforating Guns, however, do not have this type of helical detonating cord configuration and have instead a more or less straight detonating cord along the Perforating Gun axis, either for the whole length of the gun or just for certain portions of the gun. These Perforating Gun designs will of course exhibit an effective detonation velocity that approaches the value of the absolute detonation velocity of the detonating cord itself, e.g. greater than 20 ft per msec.

FIG. 10 also depicts the seismic wavelet associated with the seismic energy that propagates from the exploding gun toward the earth surface. The seismic waves, of course, propagate in all directions, but only the upward traveling waves are considered here. Wave A in FIG. 10 is the leading edge of the leading wave 1000, i.e. the first seismic energy in the seismic wavelet that travels upward from the first shaped charge to explode. It progresses upward at a velocity Vr that is the compressional wave velocity (p wave velocity) of the rock through which it travels and will typically be the first energy from the detonation to be received by the seismic sensor array.

At time $t_{4.5}$ the Wave A 1000 will have reached a position well above the top of the gun as shown. At this time the detonation front 1030 has reached a position midway along the Perforating Gun. As each shaped charge explodes new seismic energy is emitted. A quasi-continuous series of seismic wavelets, one from each shaped charge, are intermingled as they progress upward. The figure shows the leading edge of the leading wave from the shaped charge midway along the gun beginning to form at time $t_{4.5}$ At time $t_5$ Wave A and following waves have progressed further upward and the detonation front has progressed further downward and just caused the bottom-most shaped charge to explode. Wave B begins to emanate upward at this instant, representing the leading edge of the trailing wavelet. No further wavelets are initiated as the explosive material in the Perforating Gun is now totally spent.

A short time later at time $t_{5.5}$ the Wave B has progressed upward to a point somewhere above the bottom of the gun and Wave C, defined as the trailing edge of the trailing wavelet has progressed a short way up from the bottom of the gun. All of the waves between A and C continue upward, eventually reach the seismic sensors and are recorded as a Composite Wavelet.

This Composite Wavelet 1100 may be viewed as the summation of a set of individual Basic Wavelets 1210, one from each segment of the Perforating Gun, with each successive wavelet delayed by a small amount of time relative to the prior wavelet. For a downward propagating detonation and simple geometry, the amount of the delay is the sum of the time for the detonation to propagate down the gun to the next segment plus the seismic travel time from the lower segment to the upper segment.

Figure 24:
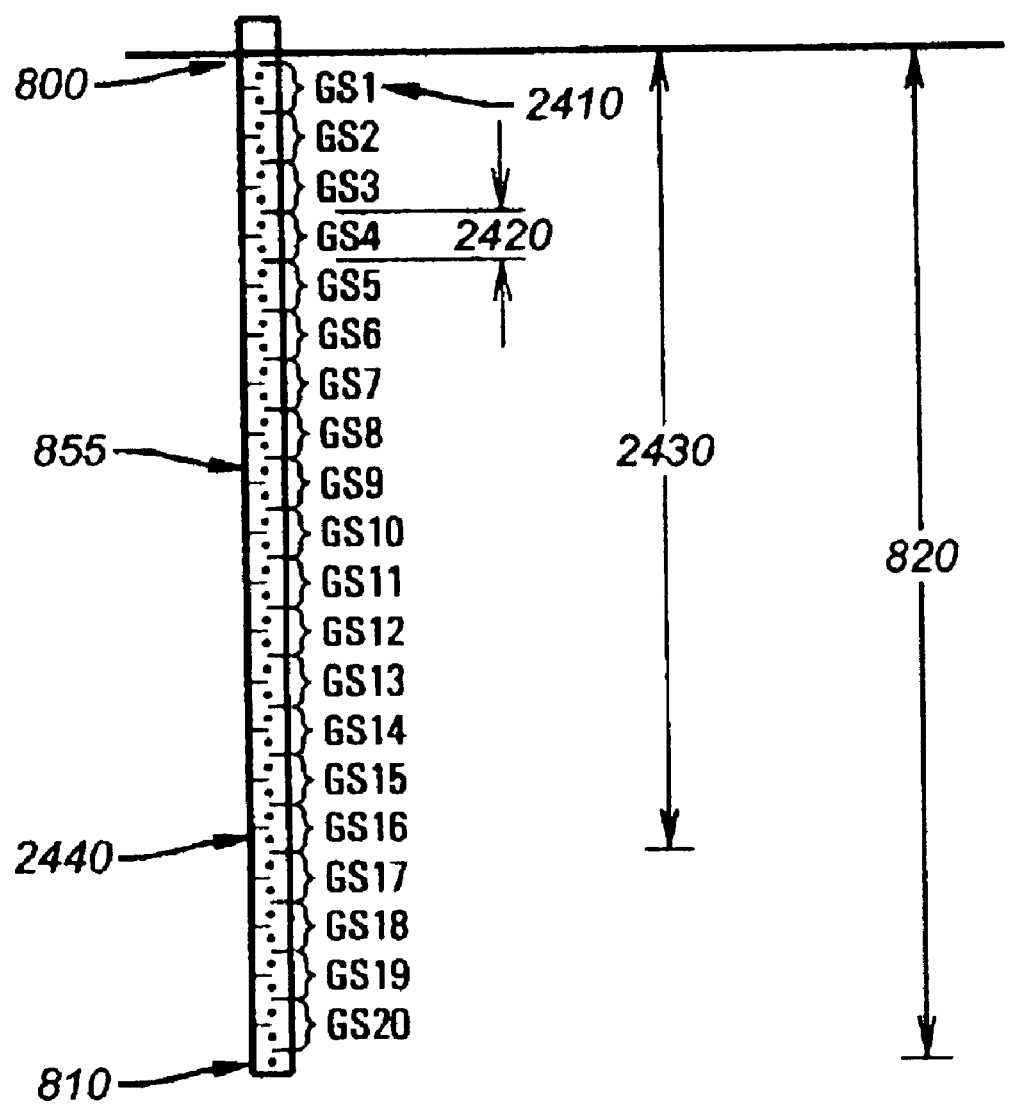
FIG. 24 is a diagram of the Perforating Gun divided into Gun Segments and showing the point of misfire and effective Gun Length.

A Gun Segment 2410 may be defined as an arbitrarily small length of the live portion of the Perforating Gun containing one or more, but an integral number, of shaped charges. Using this definition, any Perforating Gun may be divided into a series of equally-powered Gun Segments (with the possible exception of the last segment). Each of the Gun Segments would generate the same Basic Wavelet 1210 under identical conditions of detonation. FIG. 24 shows the Perforating Gun divided into a set of Gun Segments 2410.

In a constant-velocity host rock environment the Gun Segments 2410 would generate a series of upward-traveling seismic wavelets of identical form. These wavelets in addition to being of identical form would be separated in time upon departure from the vicinity of the gun and upon arrival at the seismic receiver by equal increments of time. This suggests a method of modeling the Composite Wavelet 1100 which is used in FIG. 11 and subsequent figures, to model Composite Wavelets given an arbitrary Basic Wavelet 1210, i.e. the wavelet from one segment of the Perforating Gun.

FIG. 11 shows Composite Wavelets from five different lengths of Perforating Gun varying from 13 ft to 320 ft. The autocorrelation of each Composite Wavelet appears on the right side of the figure. As the length of the Perforating Gun increases the appearance gradually changes from that of a fairly simple wavelet to a two-part wavelet with a predominately positive first half and a predominately negative second half. In fact the second half appears to be the same as the first half but with opposite polarity. This is the exact case. The first half of the Composite Wavelet of a long perforating gun may be either negative or positive, depending on the initial polarity of the Basic Wavelet, but will always be of opposite polarity to the second half. The 320 ft gun is also found to have a time delay between the first half and the second half exactly equal to the modeled time between the "leading edge of the leading wave" and the "leading edge of the trailing wave" (see FIG. 10). The autocorrelation also exhibits a strong negative side lobe peaking at this time relative to the zero-lag peak.

Figure 12A:
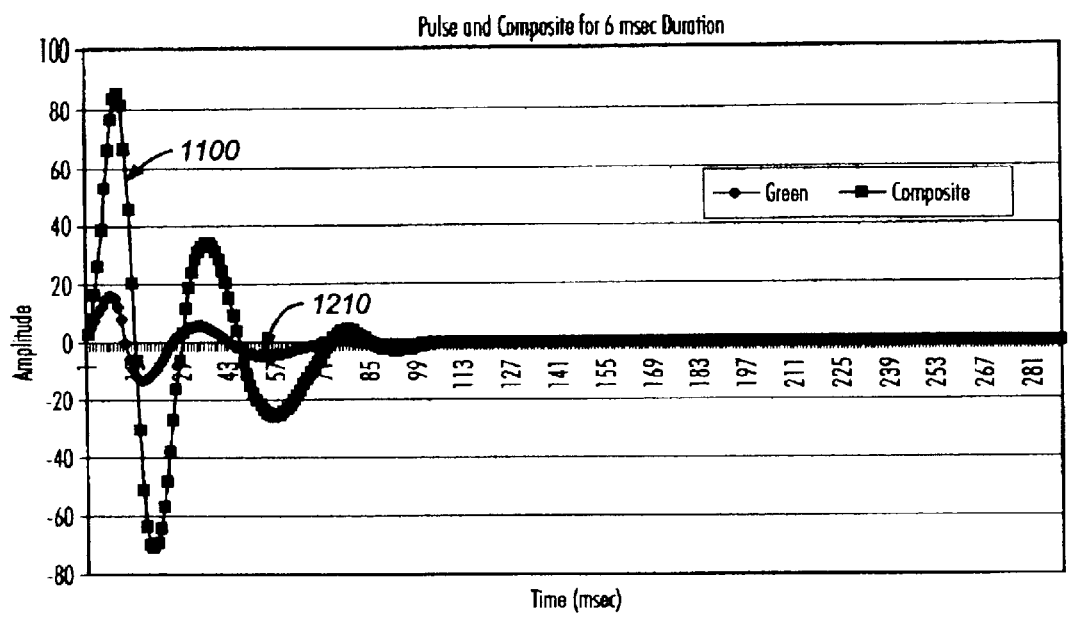
FIG. 12 shows a basic wavelet and its composite for 6, 24 and 96 milliseconds (msec) Duration
Figure 12B:
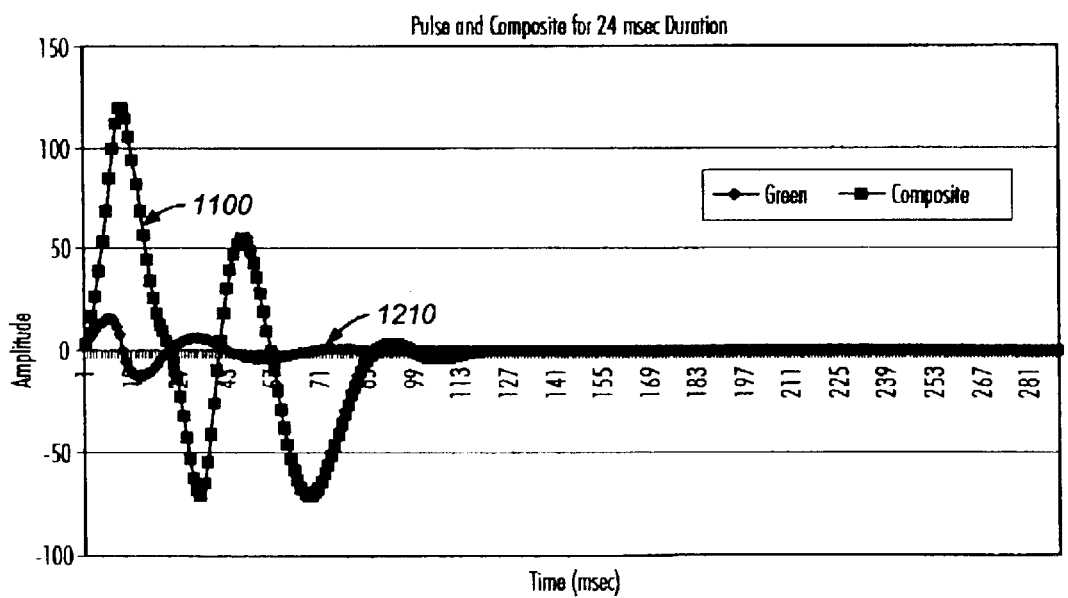
Figure 12C:
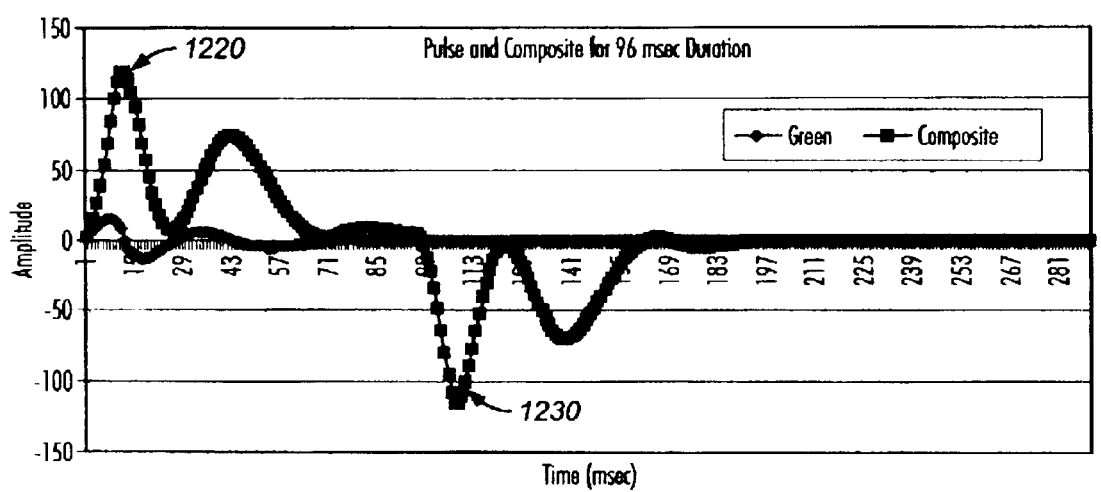

FIG. 12 provides three examples of Composite Wavelets 1210 of varying Duration: 6, 24 and 96 msec. Also shown is the Basic Wavelet 1210, which was summed to yield the Composite Wavelet. The Basic Wavelet is the wavelet from one segment of the Perforating Gun. Duration is defined as the time interval between the "leading edge of the leading wave" and the "leading edge of the trailing wave" and may be computed—in the case of simple vertical geometry—by adding the time interval between the detonation of the first Gun Segment and the detonation of the last Gun Segment to the seismic travel time between the position of the last detonating Gun Segment and the position of the first Gun Segment.

The Duration for a given detonation of a given Perforating Gun is a function of the position of the seismic sensor array. For a vertical borehole and uniform geology the maximum Duration value would be observed at the wellhead. In this case if the sensor array is positioned away from the well head the Duration is reduced—eventually to zero at very great distances away from the well head. For non-vertical boreholes, the Duration will be maximized at some set of positions away from the well-head. Because the determination of EOD is benefited if the Duration can be observed at maximum value, the practitioner should consider this when deciding the location of the sensor array. Ray-path modeling can guide this decision. A compromise between maximizing Duration and achieving best signal-to-noise ratio may be required in some cases.

Again referring to FIG. 12, the 6 msec and 24 msec Duration Composite Wavelets do not show separation into a first half on one polarity and a second half of opposite polarity. This is due to the fact that the Basic Wavelet is too long relative to the Duration to allow this appearance, causing the two parts to overlap. However the 96 msec Duration Composite Wavelet does show this clear separation into two opposite polarity halves. The time interval between the leading peak 1220 and its negative counterpart, the following trough 1230, is precisely 96 msec, the exact value of the Duration.

This suggests a method of determining extent of detonation at least for long Perforating Guns, that is, guns that are long enough to have good separation between the leading (first polarity) and trailing (second polarity that is opposite to first polarity) halves of the Composite Wavelet. Unfortunately many Perforating Guns are not long enough for this to occur. But when the Perforating Gun is sufficiently long to provide this separation in its Composite Wavelet, the extent of detonation can be estimated this way, providing the geometry and positions of the gun and seismic receiver are known, ray path geometry can be modeled, and detonation and seismic velocities are known. The time separation between first and second halves of the Composite Wavelet may be measured directly or preferably with aid of the autocorrelation. This time is equated to the sum of detonation propagation time and the differential seismic travel time to the receiver for the first Gun Segment and the last Gun Segment. The position of the last Gun Segment that is assumed to actually have detonated is varied in the calculations to achieve the best equivalence. If this best equivalence is not obtained when calculating for the last physical Gun Segment in the Perforating Gun, a partial misfire is thereby determined to have occurred.

A total misfire can also be conveniently determined using an autocorrelation method or by direct observation of the seismic recording. If the autocorrelation of the seismic data received after the gun is expected to have fired does not indicate a significantly higher level then during a period of known quiescence, total misfire is likely to have occurred. Further evidence of a total misfire is the absence of first energy on the seismic recording with its predictable delay time from one seismic sub-array to the next and its typical waveform and energy pattern as can be determined by one experienced in seismic methods.

Figure 25A:
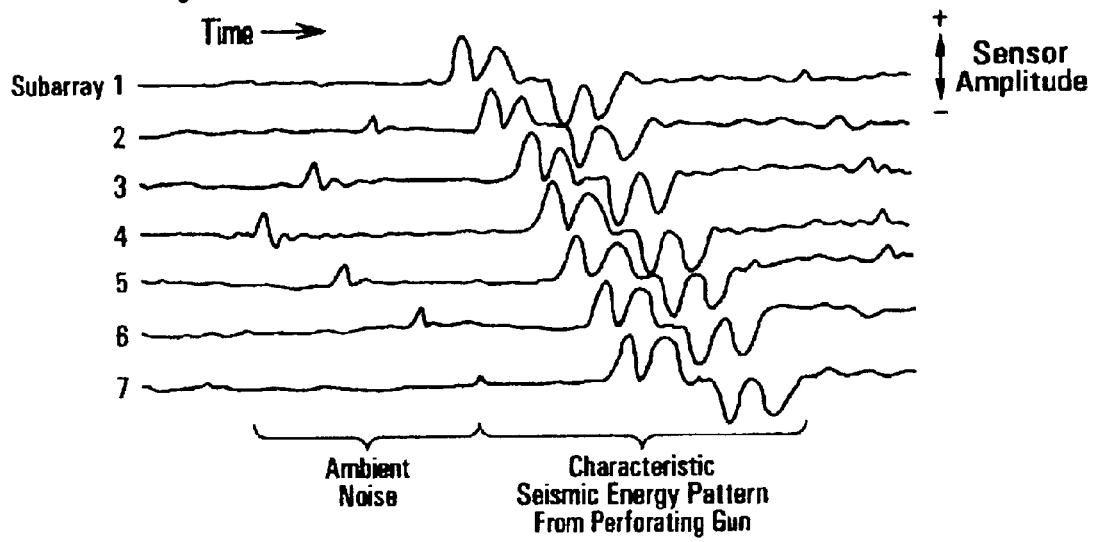
FIG. 25 shows the seismic recording of a successful detonation and of a total misfire of a Perforating Gun.

FIG. 25*a* depicts a seismic recording made with the EOD system 115 with a typical Surface Seismic Receiver 210 as detailed in FIG. 4. In this recording the Perforating Gun has detonated and fired successfully. A characteristic seismic energy pattern appears with successive arrival times as predictable from ray trace modeling from nearest to furthest seismic sensor sub-array from the Perforating Gun. The seismic energy stands above the level of the seismic noise energy. Measurement of like wavelet peak and trough times can be used together with the ray-path-modeling predicted travel times from the top of the gun to each seismic sub-array to determine whether the origination of the seismic energy was at the location of the Perforating Gun. While patterns of coherent seismic events may appear on the seismic noise recording they do not exhibit the arrival time pattern of the energy from the location of the Perforating Gun. Neither do they show the wavelet shape characteristic of a long Perforating Gun with a first half of one polarity and a second half of opposite polarity. Finally, the amplitude levels of the typical seismic noise do not reach the amplitude levels of the characteristic energy from the detonation of the Perforating Gun. All of these criteria can be used to verify that the observed seismic energy is in fact from the Perforating Gun detonation.

Figure 25B:
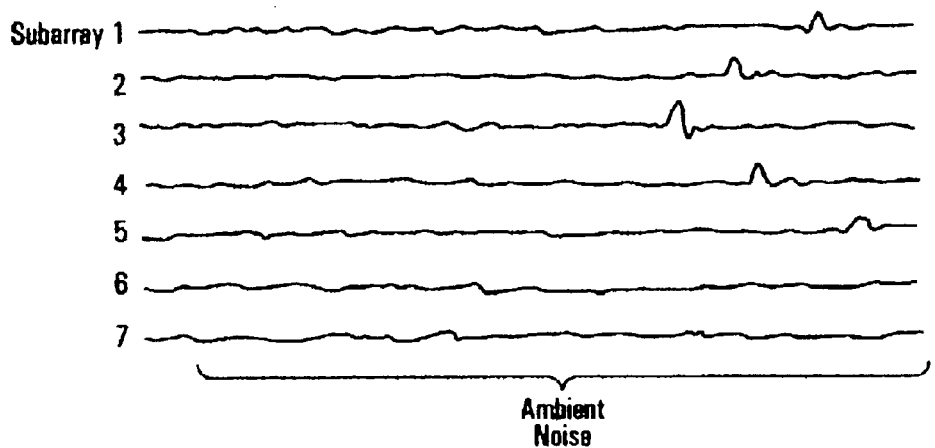

FIG. 25b shows the seismic recording made during a time period in which a Perforating Gun was expected to fire. The characteristic seismic energy pattern from the Perforating Gun is not evident. Only the amplitudes and energy patterns indicative of seismic noise are discernable. From the evidence of the recording in FIG. 25b a conclusion can be made that the Perforating Gun did not fire. Only in the case of very high relative seismic noise levels—sufficiently high to obscure the energy from the Perforating Gun—could this conclusion be incorrect. Experience can provide a guideline as to what level of seismic noise could obscure the seismic energy of a particular Perforating Gun as detected by a given seismic sensor array. Thus direct observation and analysis of the seismic energy patterns recorded by the EOD system 115 can be used to determine with a high degree of certainty the occurrence of a total misfire.

Independently of wavelet shape, the amplitude of the Composite Wavelet that is observed from the detonation of a perforating gun can also give an indication of the length of gun that actually detonated. Various measures of amplitude including, for example, maximum peak amplitude, rms amplitude, average absolute amplitude and average power may be used to compare a particular observed Composite Wavelet to other Composite Wavelets. Referring to FIG. 11, the Composite Wavelets for the various gun lengths exhibit a progressive increase from shortest perforating gun to longest perforating gun (left side of figure labeled Gun Signatures.) These wavelets were modeled to simulate the wavelets that would be observed under identical physical conditions including geology, type of perforating gun, position of top of gun, and type and position of seismic receiver. If another perforating gun Composite Wavelet for these same conditions, but a different gun length were modeled, it could be readily compared to the six wavelets and its effective perforating gun length computed, interpolating between shorter and longer guns. A quantitative estimate of the length of gun that detonated to produce the new Composite Wavelet could be thus obtained. Of course, wavelet shape as well as amplitude could be used together to improve the estimate.

In the case of real observed Composite Wavelets the same procedure could be applied if comparison wavelets were available. The comparison wavelets would preferably have been obtained from identical gun type, at similar depth, under similar geologic conditions—it would not be possible to have identical conditions as in the model study above. If perforating gun detonations were routinely recorded in a given geologic environment, such as within a geologic basin or within an oil field, a set of wavelets could be made available for comparison and computation of effective gun length and extent-of-detonation as described above for the models. Simple correction factors for varying depths, type of perforating gun and other variables can be applied to improve the accuracy of the determination. As in the model case, both wavelet shape and amplitude can be used separately and in combination to improve the accuracy of the extent-of-detonation computation.

Another method of determining the extent-of-detonation of a perforating gun is next disclosed. This method relies on inversion of the Composite Wavelet instead of the previously described observations, comparisons and computations. Like the methods previously described, the inversion method also relies upon predetermined potentials of the Perforating Gun, based on physical conditions, computations, theoretical predictions and/or actual observations of Composite Wavelets. It can be used independently or together with the other methods to give independent quantitative determinations of the extent-of-detonation.

This inversion method of determining extent of detonation can work effectively when the Perforating Gun is detonated in a portion of a borehole that is neither perfectly linear nor perfectly vertical. In many cases the borehole will not be vertical—Perforating Guns are often used in horizontal boreholes or boreholes that represent less extreme cases of non-verticality but are none the less non-vertical. Furthermore, the borehole axis is not necessarily a straight line; it may be curved in two or three dimensions. A borehole that is curved in three dimensions is called herein a curvilinear borehole or a 3D borehole.

One of the assumptions made in constructing the Composite Wavelets of FIG. 11 and FIG. 12 is that the seismic velocity in the vicinity of the Perforating Gun is constant. This assumption might be good for many cases involving relatively short guns, but it would be desirable to have a method that would not rely on such an assumption. To be generally applicable and able to deal with medium length and longer Perforating Guns, a method of determining extent of detonation must be able to handle the case of variable seismic velocity in the rock surrounding the Perforating Gun.

Such a method combining all of these desirable and essential features has been invented and demonstrated to work using model data; and is the subject of the remainder of this Preferred Embodiment section.

A two-stage inversion process has been invented that is applied to the Composite Wavelet that is recorded when the Perforating Gun is detonated. The first stage (Stage 1) of the inversion ideally yields an output wavelet (Stage 1 Wavelet) that is equivalent to the convolution of the Basic Wavelet with a positive unity spike at time zero (+1) followed by a negative unity spike (−1) at a time equal to the Duration of the Composite Wavelet. Or stated another way, the Stage 1 Wavelet is the sum of a positive Basic Wavelet starting at time zero (t+0) and a negative Basic Wavelet delayed by the time of the Duration (t=Duration).

This ideal output occurs in the Stage 1 inversion process only under one crucial condition. That condition is that the process is given the correct value of Duration to use. But the practitioner does not know this value, because this is the whole objective of the exercise, to learn the actual value of Duration. Therefore a series of Stage 1 inversions must be performed, assuming every possible value of Duration. The maximum possible Duration corresponds to the detonation of the entire Perforating Gun. The minimum Duration corresponds to the firing of only the very first Gun Segment. The Duration range from maximum to minimum Duration is sampled at a suitably small interval, for example an interval equivalent to the Duration increment caused by adding a single Gun Segment to the Perforating Gun.

When the correct actual value of Duration is used in the Stage 1 inversion process, the ideal output results. For longer guns the Stage 1 output will be similar in appearance to a Composite Wavelet from a longer gun. The second half will be a polarity-reversed repetition of the first half; however, unlike the Composite Wavelet, the first half will not be predominately of one polarity (the first polarity) and neither will the second half be predominately of one polarity (opposite to the first polarity). Each half will have a zero mean, i.e. will be oscillatory around zero amplitude.

For short and medium-length guns, the first half will be overlapped with the second half, making it difficult to observe the positive and negative Basic Wavelet components of the Stage 1 Wavelet. For longer guns it is possible to discern the probable correct value of Duration by comparing Stage 1 Wavelets over the range of assumed Duration values. For short and medium length guns this is not possible.

The second stage of the inversion process (Stage 2) is applied to the Stage 1 Wavelet and yields an output that is a single Basic Wavelet starting at time zero (t=0), free of all other information. This resolves the problem of interpreting the correct value of Duration for all lengths of Perforating Guns, including short and medium length guns.

The Stage 2 inversion assumes the same value of Duration that was assumed in the Stage 1 inversion and thus the two stages are consistent in this regard. Thus the output wavelets from the two stages may be displayed on a one-for-one basis, as in FIG. 13. On the left are shown five Stage 1 wavelets, each for a different assumed value of Duration, from 11 msec to 15 msec at 1 msec intervals. On the right are the corresponding Stage 2 wavelets.

Figure 13C:
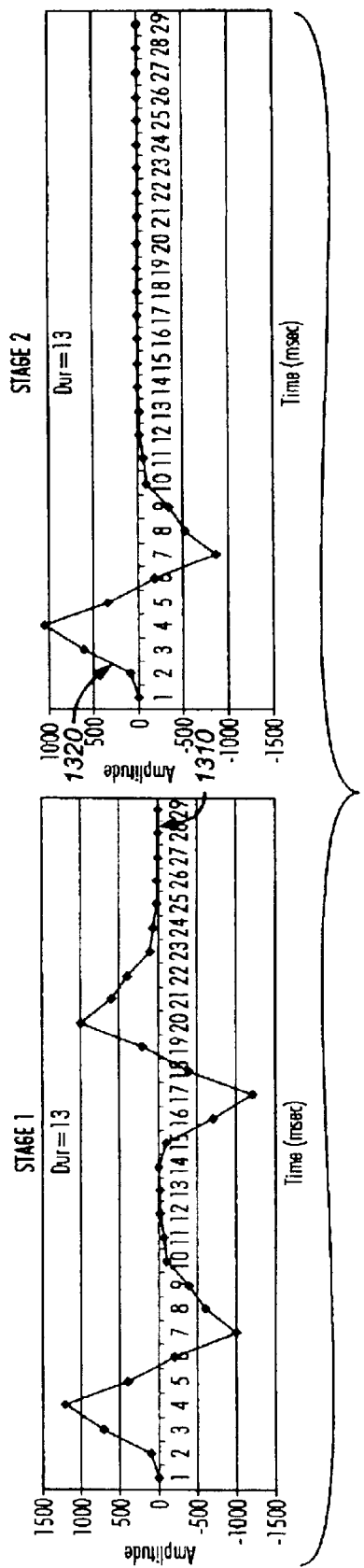
FIG. 13 shows successive stages of the inversion of a Composite Wavelet for varying assumptions of extent of detonation.
Figure 13D:
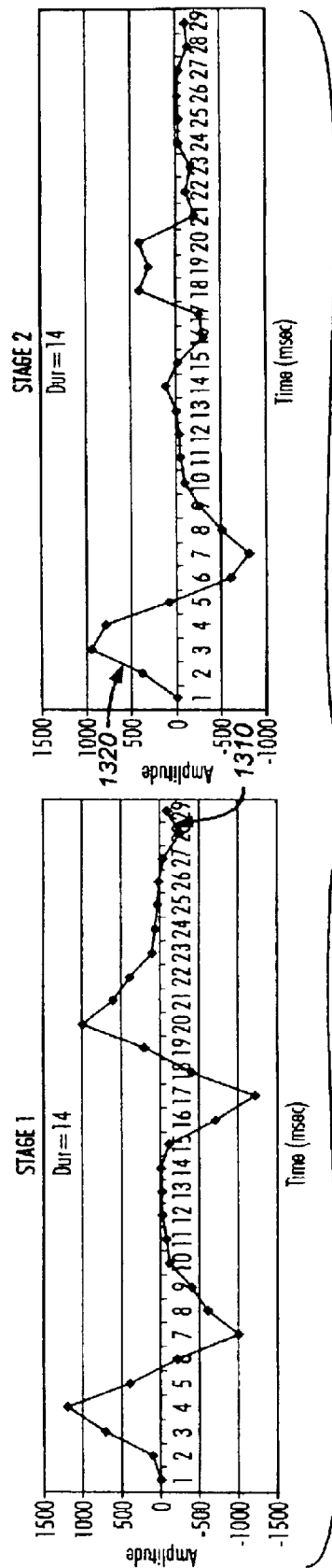
Figure 13E:
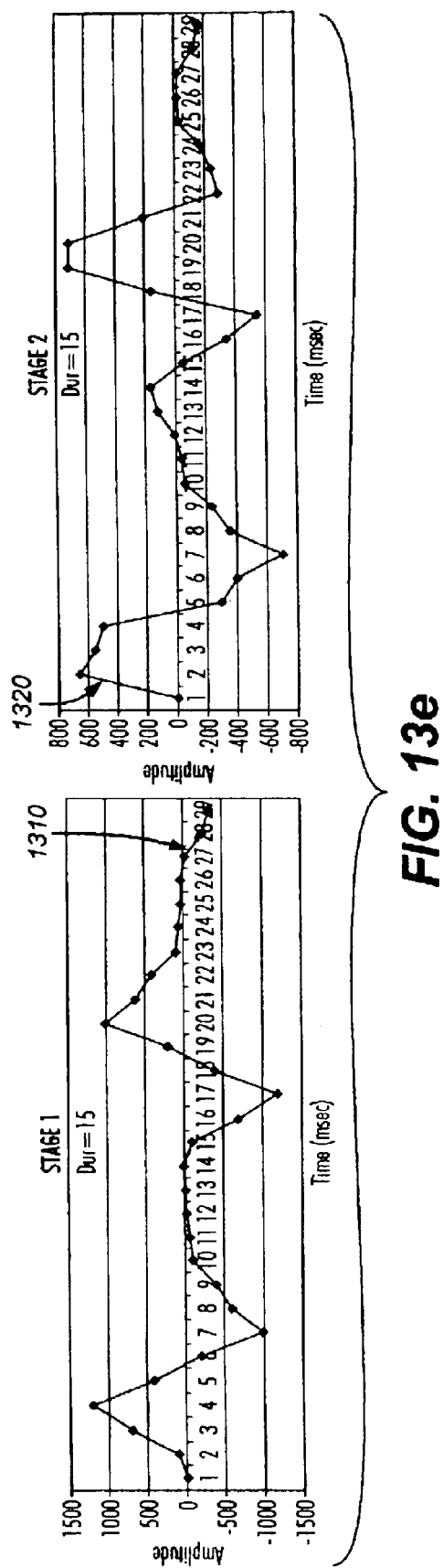

In the example of FIG. 13, the value of Duration used to model the Composite Wavelet that was input to the inversion process is 13 msec. By careful observation one can discern that the Stage 1 wavelet for the 13 msec inversion 1310 is the most perfect repetition of positive front half followed by a polarity-reversed second half. However, each of the five gives a reasonably good representation of this appearance, and it would be somewhat challenging to determine the correct Duration from this evidence alone.

On the right of FIG. 13 the Stage 2 inversion wavelets are displayed. The Stage 2 wavelet for a Duration assumption of 13 msec 1320, clearly shows the minimum energy of the five. Its initial wavelet is followed by a quiescent tail whereas for other values of Duration, the tail continues to oscillate, even increasing in amplitude for Durations of 11 and 15 msec. The Stage 2 wavelets are compared mathematically and visually by the user to determine the correct value of Duration for the detonation that occurred. The correct value, Duration=13 msec, is chosen.

This chosen value of Duration must then be converted to the value of the length of Perforating Gun that actually detonated. This is done using the known values of detonation velocity, seismic velocity and locations of the receiver and Perforating Gun, and modeling the seismic ray paths to determine the seismic travel times. The first step in this process is to build a Duration Table as illustrated in FIG. 23, containing values of travel time from the center of each Gun Segment to seismic receiver and the corresponding values of Duration. These values of Duration are as would be observed if the gun misfired after that Gun Segment 2410. The point of the misfire 2440 and the Effective Gun Length 2430 are shown on FIG. 24.

If Vertical Seismic Profiling (VSP) observations of travel time are available, they may be used to build the Duration Table. If VSP observations are not available, the values of travel time are preferably obtained by ray tracing, using all available information pertaining to the space-time variant seismic velocity field in the vicinity of the borehole. In a simplified variation of the method the user may assume straight ray path travel which under some conditions, e.g. when velocity is nearly invariant, is a sufficiently accurate way to model the ray paths.

Knowing the effective velocity of detonation of the Perforating Gun, $V_d$, the following relationship is applied:

$$\text{Duration}=(L/V_d)+DT \qquad \text{Equation 1}$$

Where L is the Effective Gun Length 2430 i.e. the length of the gun that detonates down to the point of the misfire, or bottom of the gun if there is no misfire, $V_d$ is the effective detonation velocity, and DT is the difference in seismic travel time (to the receiver) for the first Gun Segment and the last Gun Segment to fire.

Having already determined the chosen actual value of Duration as previously described, or by using the more general 3D borehole method described subsequently to determine Duration, the practitioner finds in the Table (FIG. 23) the value of travel time that corresponds to this value of Duration, interpolating between values in the table if necessary. Alternately, a specific ray tracing may be performed that exactly corresponds to this value of Duration.

In either of these two cases, this value of travel time from the last Gun Segment and the travel time for the first Gun Segment are differenced to compute DT, and the equation rearranged to compute L (* signifies multiplication).

$$L=(\text{Duration}-DT)^*V_d \qquad \text{Equation 2}$$

This value, L, is the primary measure of the extent of detonation of the Perforating Gun, and the objective of all of the preceding and following described processes of this invention. A related measure of the extent of detonation is the percentage of the total gun that actually detonated, found by dividing L by the total Gun Length and multiplying by 100.

In summary, the length of the Perforating Gun that actually detonated is equal to the determined value of Duration less the differential seismic travel time between the first Gun Segment and the last Gun Segment that detonated and that quantity multiplied by the effective detonation velocity $V_d$ of the Perforating Gun.

Because the result is dependent on differential travel time rather than total travel time the result is not dependent on highly accurate modeling of the intervening geology between the top of the gun and the receiver. Only the modeling of ray paths in the vicinity of the gun itself must be done accurately. This modeling is easily and accurately performed if the seismic velocity field in the vicinity of the Perforating Gun has been measured using conventional well logging techniques, as are well known in the industry, and has been extrapolated using structural geologic maps as are typically available for an oil field.

If a VSP seismic survey has previously been performed for the well undergoing perforation the total seismic travel times will have been accurately measured for multiple positions along the borehole, for travel between the borehole and selected surface locations. In this case it is recommended that a subset of the surface locations be reoccupied for the EOD receiver locations, so that the accuracy of the ray path modeling may be verified, or adjusted to agree with observed times, for the total travel path. Modeling parameters may be adjusted until a good match is achieved between the modeled travel times and the VSP observed travel times. Alternatively the modeled times may be simply replaced by the VSP observed travel times.

Figure 14A:
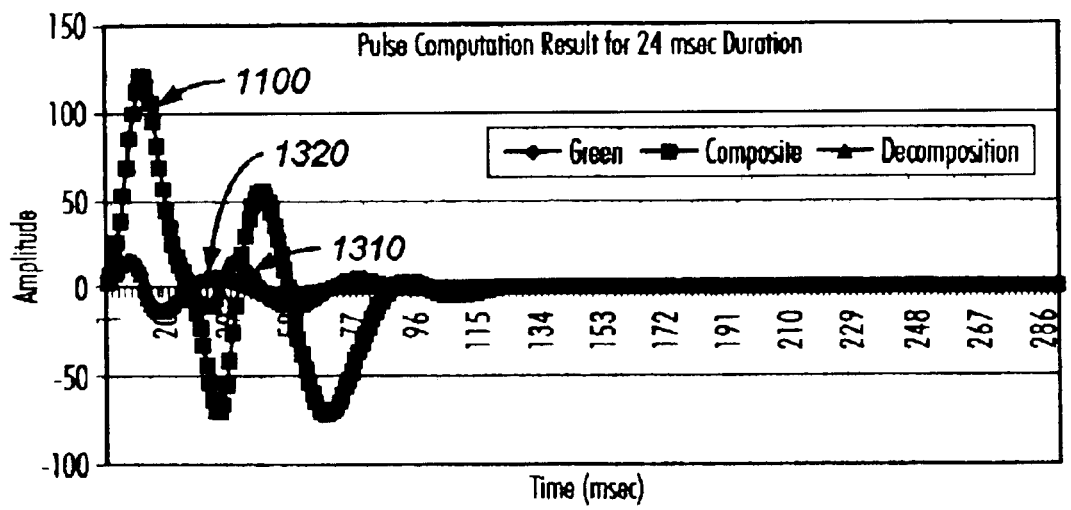
FIG. 14 contains three graphs that show the input and output of the inversion process to determine the Duration in the 24 msec case FIG. 15 contains three graphs that show the input and output of the inversion process to determine the Duration in the 6 msec case
Figure 14B:
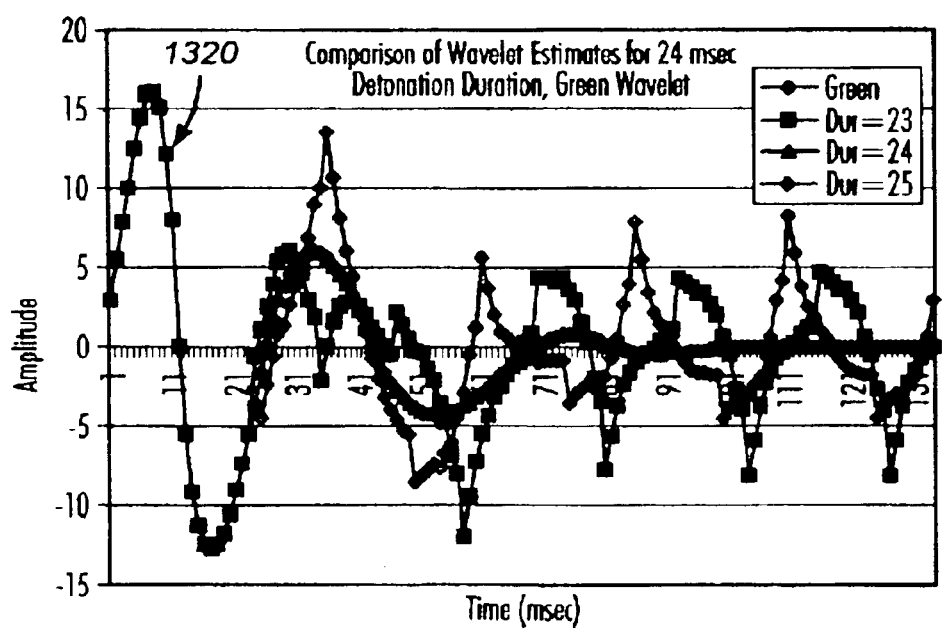
Figure 14C:
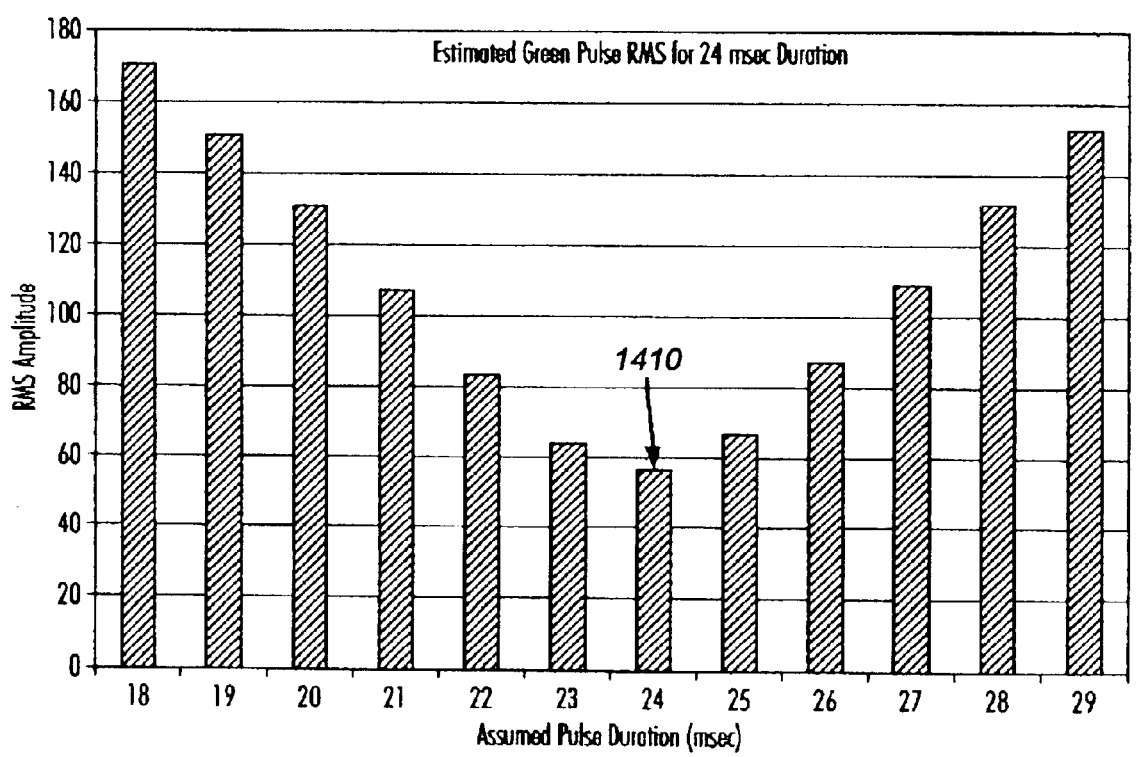

FIG. 14 shows results for a different example, a case where the gun is relatively short so that the two halves of the Composite Wavelet and of the Stage 1 Wavelet are heavily overlapped. The top graph of FIG. 14 shows the Composite Wavelet 1100, the Stage 1 wavelet 1310 and Stage 2 wavelet 1320 estimated for Duration=24 msec. The middle graph shows the Stage 2 wavelets 1320 for three differing assumed Durations, 23, 24, and 25 msec. The bottom graph is a plot of the RMS amplitude of the tail energy of the Stage 2 wavelets. In this example, the value of Duration to build the model was 24 msec. The Stage 2 wavelets have nearly identical first cycles but are highly divergent for later times. The Stage 2 wavelet for Duration=24 msec becomes quiescent after a few oscillations but the neighboring wavelets are highly oscillatory, exhibiting distorted unstable tail energy. The RMS Amplitude graph shows a very distinct minimum 1410 at the correct value of Duration=24 msec. Thus the process is very well able to find both mathematically (by power computation) and by visual evidence (wavelet shape) the correct value of Duration. By virtue of this finding, the length of the Perforating Gun that actually detonated can be readily calculated as previously described.

Figure 15A:
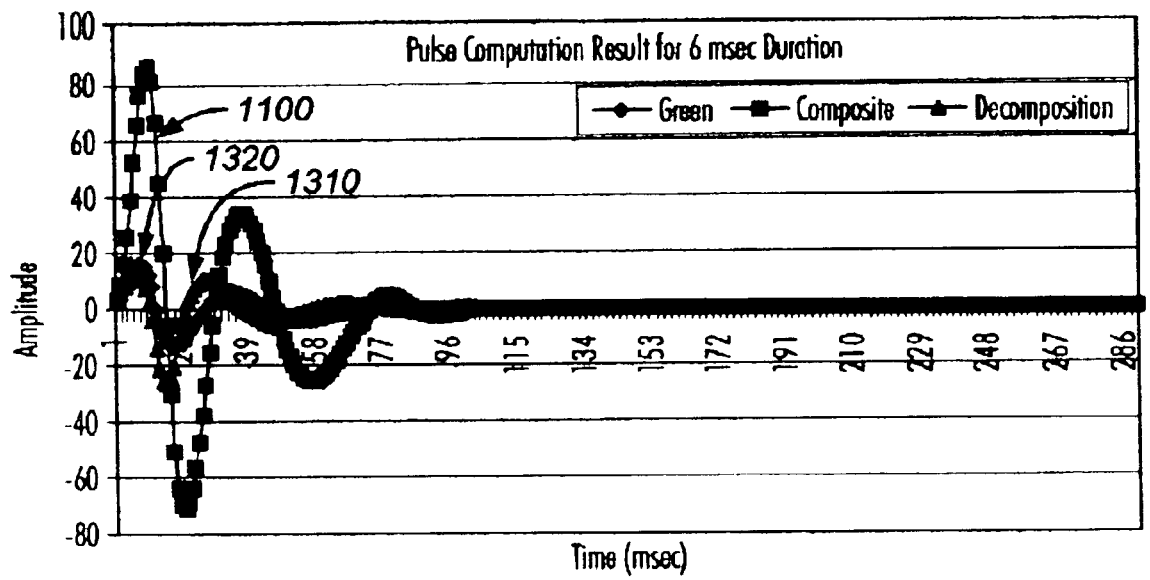
Figure 15B:
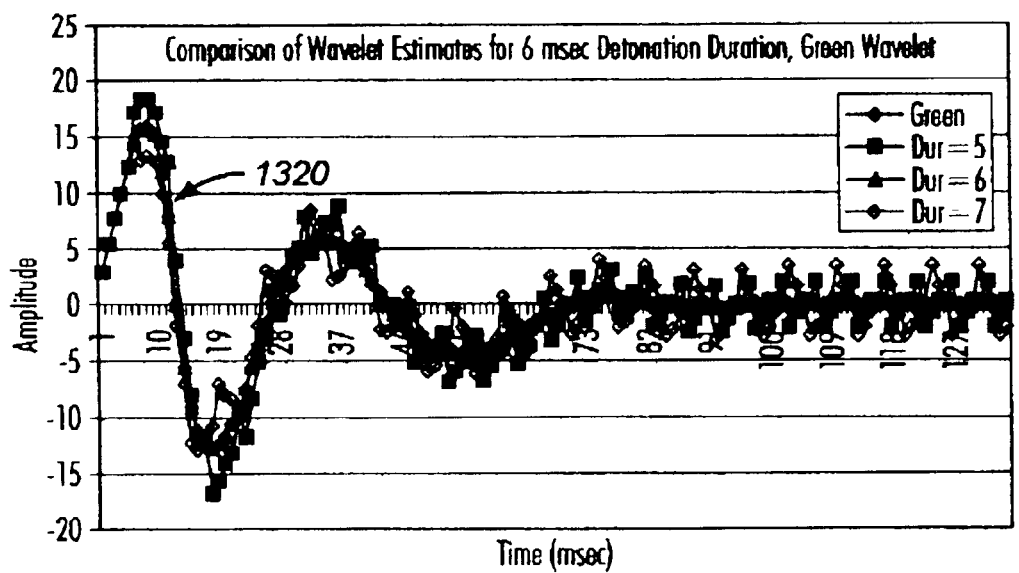
Figure 15C:
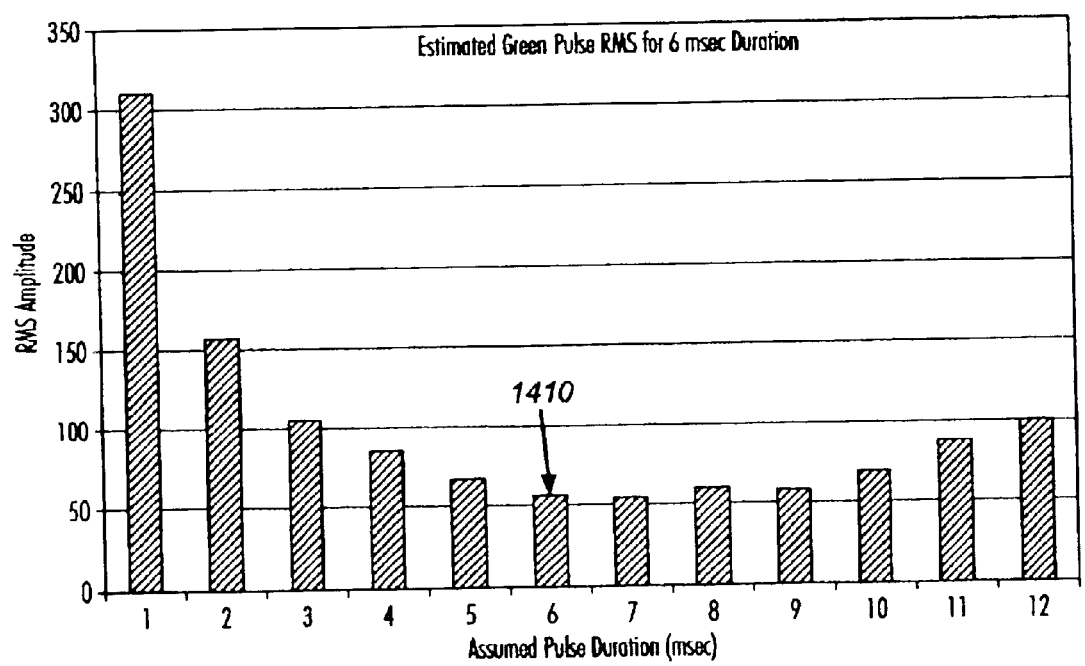

FIG. 15 shows a similar modeled example, in which a much smaller value of Duration was assumed, 6 msec. This case is more challenging to the method, because of the extreme overlap in the Composite Wavelet and Stage 1 wavelet, i.e. the gun is very short. The three graphs of FIG. 14 correspond to the three graphs of FIG. 13. Less difference is observed among the three Stage 2 wavelets in the middle graph. The Duration=6 wavelet from Stage 2 is more stable and exhibits less high-frequency distortion than its neighbors, but the difference is less pronounced than in the previous case. The RMS Amplitude graph shows a minimum 1410 at 6 msec but it is not as well resolved as previously. Thus the method works, but not as powerfully and with not as much resolution for the very short Duration Perforating Gun. In general one can expect the medium and longer Perforating Gun wavelets to be better resolved through this process than the wavelets from short guns. This translates to a better resolution of extent of detonation for the longer guns. Optimal location of the seismic receiver increases the Duration of the Composite Wavelet for a given detonation and should be considered as a method of increasing resolution by the practitioner.

Figure 16A:
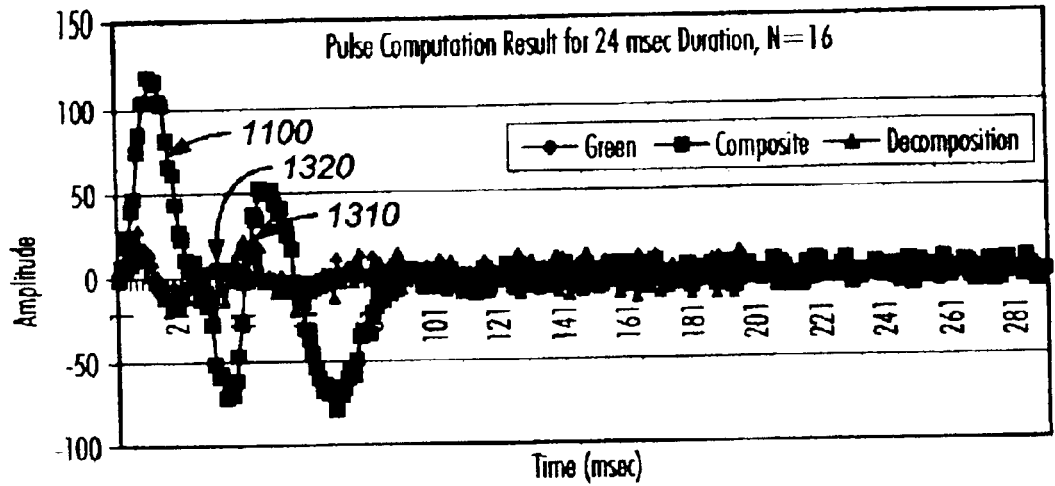
FIG. 16 shows the effect of noise on the inversion process comparing to FIG. 14.
Figure 16B:
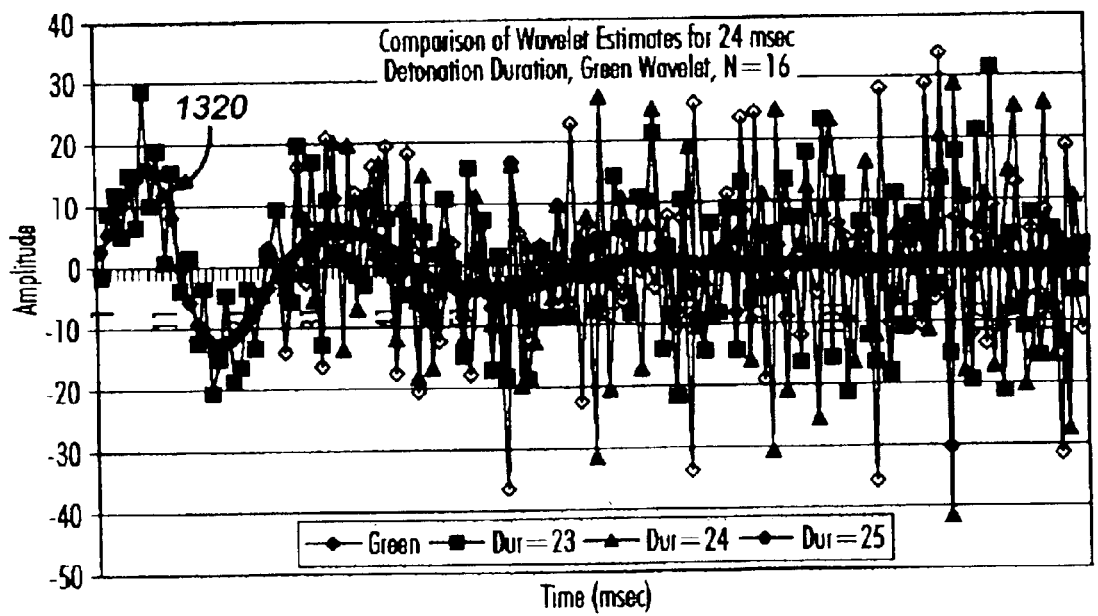
Figure 16C:
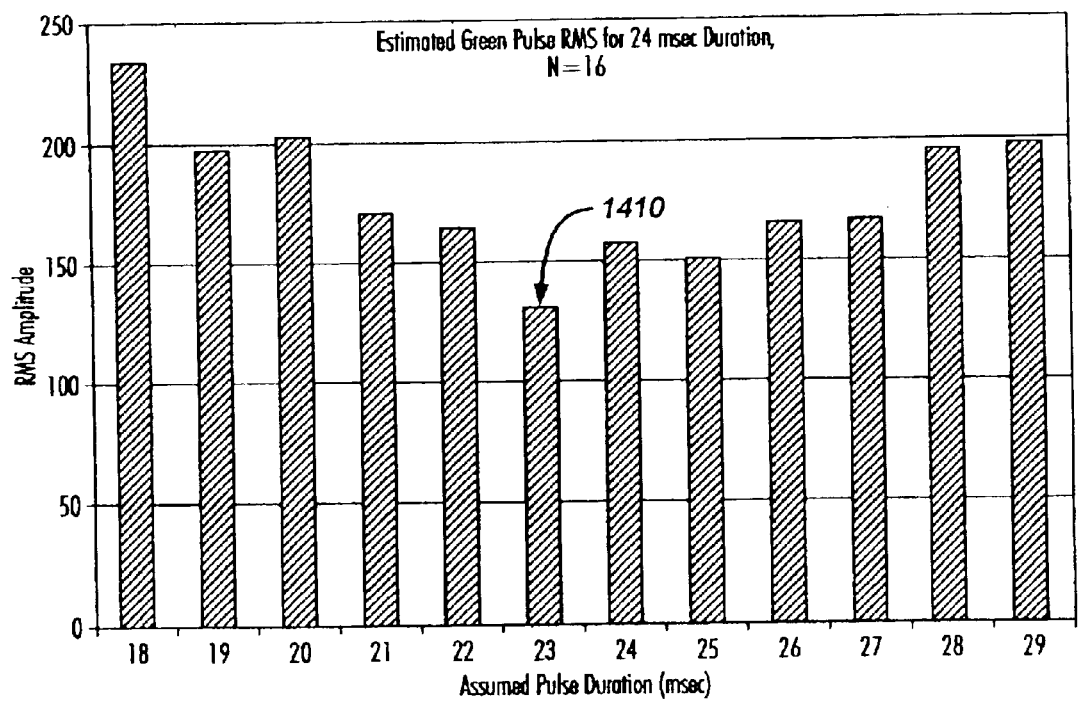
Figure 17A:
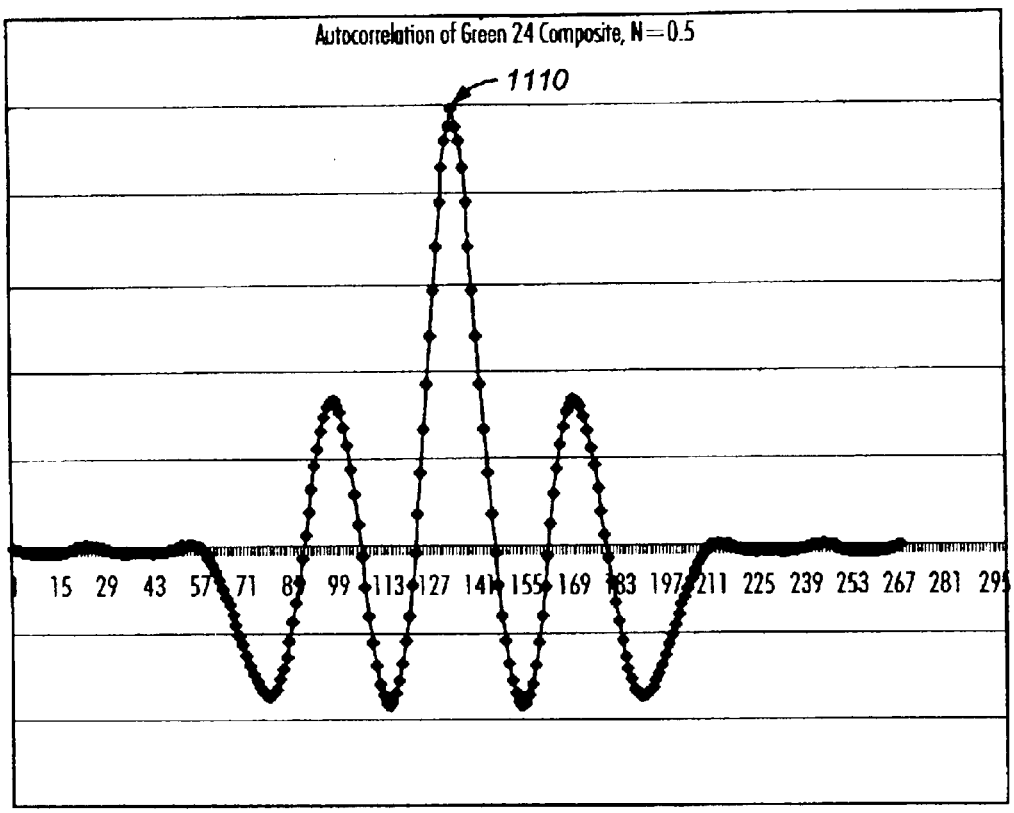
FIG. 17 illustrates the autocorrelation method of estimating Duration.
Figure 17B:
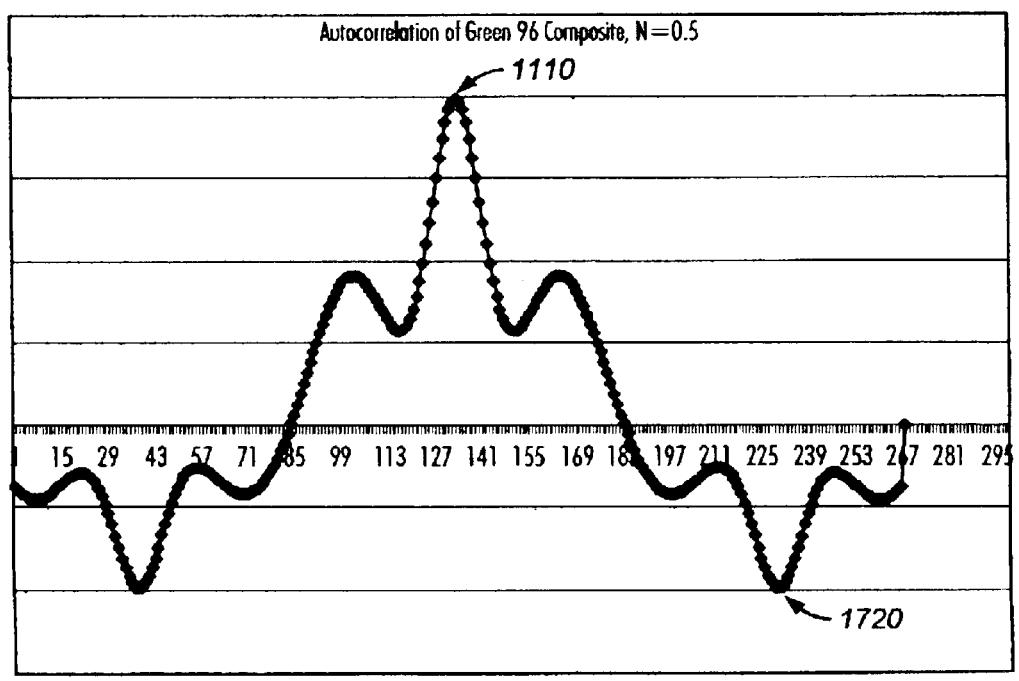
Figure 17C:
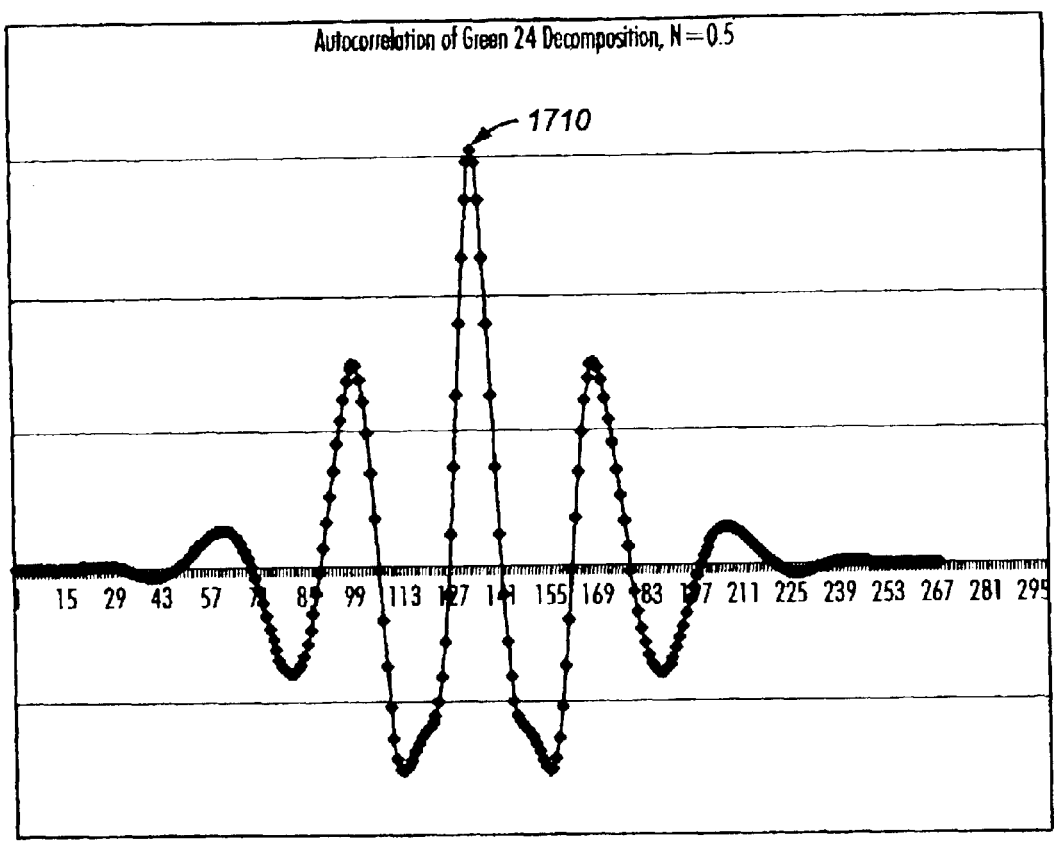
Figure 17D:
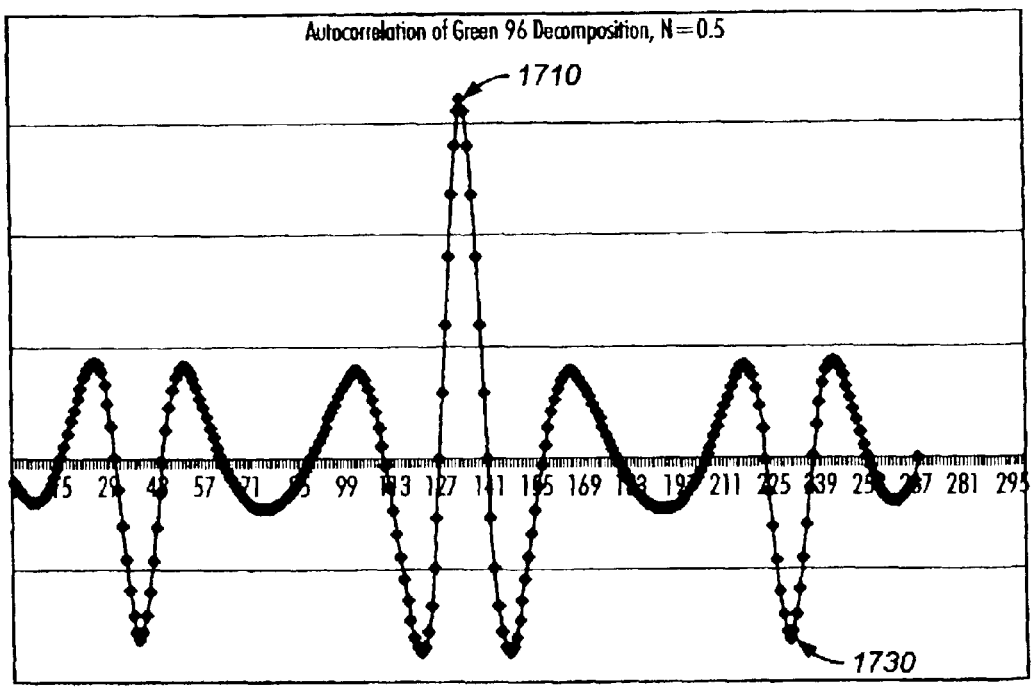

In FIG. 16 the effect of seismic noise on the inversion process is studied. In practical cases there will be some amount of seismic noise remaining in the final estimate of the true Composite Wavelet. The model used for FIG. 14 was modified by the addition of random noise and again processed through the two stages of inversion. Noise appears together with signal in the Stage 1 wavelet 1310 and Stage 2 wavelets 1320. The RMS Amplitude graph shows a minimum at 23 msec instead of 24 msec, the correct value of Duration. Thus the noise has caused a small error in the Duration calculated by the process. Curve-fitting to the RMS Amplitude values can reduce the effect of the noise and allow the correct value, 24 msec, to be calculated in this case.

Seismic noise may be reduced using well-designed arrays and sub-arrays of seismic receivers, positioning receivers in closer proximity to the Perforating Gun, positioning receivers at sufficiently great distance to avoid gun-generated noise interfering with signal and by using signal processing methods as previously described to reduce the effects of seismic noise and enhance the signal estimate.

The inversion method may be performed in the manner next described. The inversion method is applied to the final estimate of the true Composite Wavelet defined previously. The basis of the method is the assumption that the Composite Wavelet is the sum of Basic Wavelets from a series of Gun Segments, the Perforating Gun being arbitrarily divided into a series of these uniform segments, each containing an identical or at least substantially similar set of explosive components, with the possible exception of the last gun segment.

First considering a simple model in which the Perforating Gun is vertical, the rock is of constant seismic velocity, and the receiver is vertically above the Perforating Gun, it can be easily seen that the Composite Wavelet is a sum of Basic Wavelets with each Basic Wavelet delayed slightly relative to the one from the previous Gun Segment. The first sample of the Composite Wavelet is simply equal to the first sample of the Basic Wavelet. Knowing this, the second sample of the Basic Wavelet can be computed by subtracting the first value of the Basic Wavelet from the second value of the Composite Wavelet. Now the first two samples in the Basic Wavelet are known. The process can be continued for the whole Composite Wavelet until an assumed value of Duration is reached and then discontinued. The result will be a pure Basic Wavelet followed by a negative copy of the Basic Wavelet starting at the time of the Duration of the Composite Wavelet if the assumed value of Duration was correct.

Each possible value of Duration will be tried through this same process and the results compared. The outputs of the first stage of the inversion are called Stage 1 Wavelets. These Stage 1 Wavelets will also become the inputs to the Stage 2 inversion; the Stage 2 inversion will use the same assumed value of Duration as was used to obtain that particular Stage 1 result.

No assumptions have been made as to the shape or length of the Basic Wavelet to obtain the Stage 1 Wavelet nor will any be made in performing the Stage 2 inversion. Thus this invention does not require a priori knowledge of wavelet characteristics.

The foregoing process is the Stage 1 of the inversion method as appropriate for the simple case of straight vertical borehole and constant seismic velocity. It works by virtue of the fact that the first sample of the first Basic Wavelet is un-obscured. This allows a successive stripping away of overlying information to eventually reveal the Basic Wavelet summed with a delayed polarity-reversed version of itself, if the Duration assumption was correct. If this assumption was incorrect, the output will have a larger RMS amplitude and asymmetry compared to the result obtained when the correct assumption was made.

The Stage 2 inversion process is applied to the Stage 1 result, and if the Duration assumption is correct will yield the simple and pure Basic Wavelet. Otherwise the symptoms of incorrect Duration assumption including higher RMS Amplitude and unstable or high frequency tail amplitudes will be observed.

The Stage 2 inversion is very simple and is accomplished by subtracting sample by sample the early amplitudes of the Stage 1 inversion from the later Stage 1 amplitudes with a delay equal to the assumed Duration. The process continues from the first modified amplitude, at a time equal to the Duration, to a time substantially greater than the predicted total time of the Basic Wavelet. In the Stage 2 inversion after time equals twice the Duration the already-corrected Stage 2 value (rather than the corresponding Stage 1 amplitude) is used to subtract from the next Stage 1 value; thus the Stage 2 inversion iterates once for times greater than twice the Duration.

The definition of the portion of the Perforating Gun that constitutes one Gun Segment 2410 is conveniently done by choosing the portion of gun that will have its Basic Wavelet separated from those of adjacent Gun Segments by one unit time sample. The size of the Gun Segment chosen should be suitably small relative to the bandwidth of the seismic signal received and recorded. For example if 1 msec recording sample period is suitable for the seismic signal, then the Gun Segment size should be chosen such that adjacent Basic Wavelets 1320 within the Composite Wavelet 1100 are separated by 1 msec or less. For a detonation velocity of 10,000 fps and a seismic velocity of 8000 fps, the Gun Segment would be 4.44 ft to conform to 1 msec sampling. This result is obtained, by determining the Duration of the Composite Wavelet for an assumed Gun Length as described earlier, and dividing the Gun Length by the Duration. The Gun Segment Length may be set at a shorter interval to make it contain an integral and invariant number of shaped charges for every Gun Segment in the Perforating Gun to avoid issues of variable number of shaped charges in various Gun Segments.

Next, the more general case of inversion of a Composite Wavelet from a curvilinear borehole in rock of variable seismic velocity is described In this case the ray paths and the corresponding seismic travel times from the center of each of the Gun Segments to the receiver are first calculated. This may be done using various modeling methods in use within the industry. Preferably three-dimensional earth models, derived from all available sources of subsurface information, e.g. from drilling, well logging and prior seismic surveys, will be used, together with the coordinates of the Gun Segments and the receiver. The detonation velocity for the Perforating Gun is also used, as obtained from prior testing of an identical Perforating Gun. The seismic travel time for each Gun Segment is added to its detonation delay, relative to the first Gun Segment at time zero (t+0) to give the Arrival Time at the receiver for each Gun Segment.

This array of Arrival Times is used to calculate a quantity defined as Pulse Density, Pulse Density is simply the number of pulses arriving at the receiver per unit of time relative to the number of pulses arriving in the first sample of the Composite Wavelet. If, for example, the first sample in the Composite Wavelet results from the Basic Wavelet first arrival of the first Gun Segment only, and a later sample of the Composite Wavelet is the sum of first arrivals from two Gun Segments (due to hole curvature, ray path geometry, etc.) that later sample is said to have a Pulse Density of two (2). This convention is arbitrary but it makes possible a convenient adaptation of the previously described inversion method to account for the general case. It also takes advantage the equivalence between sampling density and amplitude of a function. This equivalence enables the replacement (in the representation of a combined sampled function) of a pair of simultaneous equal sampled values with a single sampled value of twice the amplitude. Using this relationship the Composite Wavelet can be represented by one sample per unit time by accounting for multiple coincident Basic Wavelets originating within one time sample—by modifying amplitude with the Pulse Density.

A series of Pulse Density values are derived, one per unit time increment, which is equal to the number of Basic Wavelets having the same Arrival Time at the receiver for that time increment of sampled Arrival Time. The Arrival Times fully account for borehole curvature in 3 dimensions and the space-time variant seismic velocity field between the Perforating Gun and the receiver, being based on ray path calculations or VSP observations, as well as the time delay incurred for propagation of the detonation front along the Perforating Gun. For perforating guns with non-uniform charge distribution and/or with variable detonation velocity along the axis of the gun, the Arrival Times can be calculated accordingly and thereby allow the Pulse Density to account for these factors. Perforating guns of this type are commonly used when multiple zones are to be perforated with intervening zones to be left un-perforated. Such guns may be constructed such that they exhibit variable detonation velocity along the gun axis.

Amplitudes of the Basic Wavelets are affected by spherical divergence loss, absorption and transmission losses during their travel from the originating Gun Segments to the receiver. These losses are different for each Gun Segment due to varying distance of travel and differing absorption and transmission losses due to passage through differing rock. These loss mechanisms may not cause significant variation among the Basic Wavelets for relatively short Perforating Guns that are far from the receiver, however for longer guns and shorter travel paths, the differences are significant and must be accounted for in the inversion process.

The spherical divergence, absorption and transmission losses expected to be incurred may be calculated through a seismic modeling process using techniques familiar to those skilled in seismic processing and modeling. Alternatively they may be measured directly from seismic recordings made in a VSP survey. These losses, one value per Gun Segment, may conveniently be multiplied by the Pulse Density values to compute Modified Pulse Density values. These values are then normalized by dividing each Gun Segment's Modified Pulse Density value by the value for the first Gun Segment. This normalizing method ensures that the complete inversion process, including Stage 1 and Stage 2, is a true amplitude process. The normalization is effected by dividing the initial Modified Pulse Density, for the first Gun Segment, into each of the Modified Pulse Density values. These Normalized Modified Pulse Density Values are termed 'Weights'.

In the Stage 1 inversion process of the invention, using the Normalized Modified Pulse Density Values as is next described, the effects of amplitude losses due to the listed causes, will be fully accommodated and therefore cause no errors in the calculation of the Stage 1 Wavelet.

To prepare for the Stage 1 Inversion, the normalized Modified Pulse Density values are converted to what is termed Adjustment Factors as follows:

$$\beta_i = [(MPD)_i - 1]*(-1) \qquad \text{Equation 3}$$

where $\beta_i$ is the $i^{th}$ Adjustment Factor and $(MPD)_i$ is the $i^{th}$ Normalized Modified Pulse Density.

The general expression for the Stage 1 inversion calculation for a point along the solution diagonal 1900 of FIG. 19 is $$Y_m^n = ['A(n-1)_n{}^` - `A(n-1)_{n-1}{}^`] + \beta_0 * X_0 + \qquad \text{Equation 4}$$
$$\beta_1 * X_1 + \beta_2 * X_2 + \ldots + \beta_{n-3} * `A(n-1)_3{}^` +$$
$$\beta_{n-2} * `A(n-1)_2{}^` + \beta_{n-1} * `A(n-1)_1{}^`$$

Where:

n is the index of the point on the solution diagonal 1900 and also of the output sample of the Stage 1 Wavelet;

m is the assumed Duration in units of time;

'A(n−1)' is A, the first column in the solution matrix when n=2; B, the second column for n=3, etc.

$A_n$ is the value in the solution matrix in column A, row n.

$\beta_0, \beta_1, \beta_2, \ldots, \beta_{n-1}$ are the Adjustment Factors;

$A_1, B_1, C_1 \ldots$ contain the Composite Wavelet; and:

$X_0 = \text{'}A(n-1)\text{'}_n + \text{'}A(n-1)\text{'}_{n-m} + \text{'}A(n-1)\text{'}_{n-2m} + \ldots$ continuing until (n-i*m) goes negative $X_1 = \text{'}A(n-1)\text{'}_{n-1} + \text{'}A(n-1)\text{'}_{n-(m+1)} + \text{'}A(n-1)\text{'}_{n-(2m+1)} + \ldots$ continuing until n-(i*m+1) goes negative;

$X_2 = \text{'}A(n-1)\text{'}_{n-2} + \text{'}A(n-1)\text{'}_{n-(m+2)} + \text{'}A(n-1)\text{'}_{n-(2m+2)} + \ldots$ continuing until n-(i*m+2) goes negative;

and so on continuing the $X_i$ series until the initial term subscript becomes negative.

Summarizing Equation 4, $Y_m^n$ is the $n^{th}$ amplitude of the Stage 1 Wavelet for an assumed Duration of m time units.

Equation 4 is used to calculate amplitude values of the Stage 1 Wavelet progressively, starting with the second value and continuing to the final value. The position of the final value is set arbitrarily but so as to include the entire significant portion of the Stage 1 Wavelet. The first amplitude value of the Stage 1 Wavelet is always set exactly equal to the first amplitude value of the Basic Wavelet, A1.

This is done because the initial value is not obscured by later arrivals and because the initial Adjustment Factor is always zero, because of the normalization process previously described. It can be seen that it is essential that the initial value of the Composite Wavelet must remain unmodified if the process is to preserve true amplitudes, because this value is also the initial value of the un-obscured Basic Wavelet.

The solution diagonal 1900 is computed progressively from first point (upper left) to last point (lower right). Values in the matrix at times later than the solution point are calculated by subtracting from the prior value, the prior solution value at the solution diagonal.

FIG. 22a shows examples of the equations that apply for typical points along the solution diagonal for a case in which the Duration has been assumed to be 3 time units (m=3). The illustrated calculations along the diagonal are all based on expansion of the general Equation 4 from n=2 to n=7 For higher values of n the calculations would proceed in the same manner, with increasing numbers of terms.

FIG. 22b shows examples of the equations that apply for points in the matrix away from the solution diagonal. Of particular importance are the calculations in the cells below the solution diagonal 1900. Note that as each successive value of the Stage 1 Wavelet is completed it is next subtracted from all values in the previous partial solution. This in effect gradually strips away overlying information to reveal the sought Stage 1 Wavelet, point by point. The right hand column contains the same values as have emerged along the solution diagonal, which comprise the Stage 1 Wavelet.

Using Equation 4 and the other relationships previously described for implementing the solution matrix, any curvilinear borehole in a variable seismic velocity medium may be inverted to reveal the Stage 1 wavelet as previously described for the simpler cases.

No revision to the previously described process is required for the Stage 2 inversion to accommodate the general case of the three-dimensional borehole.

Figure 18:
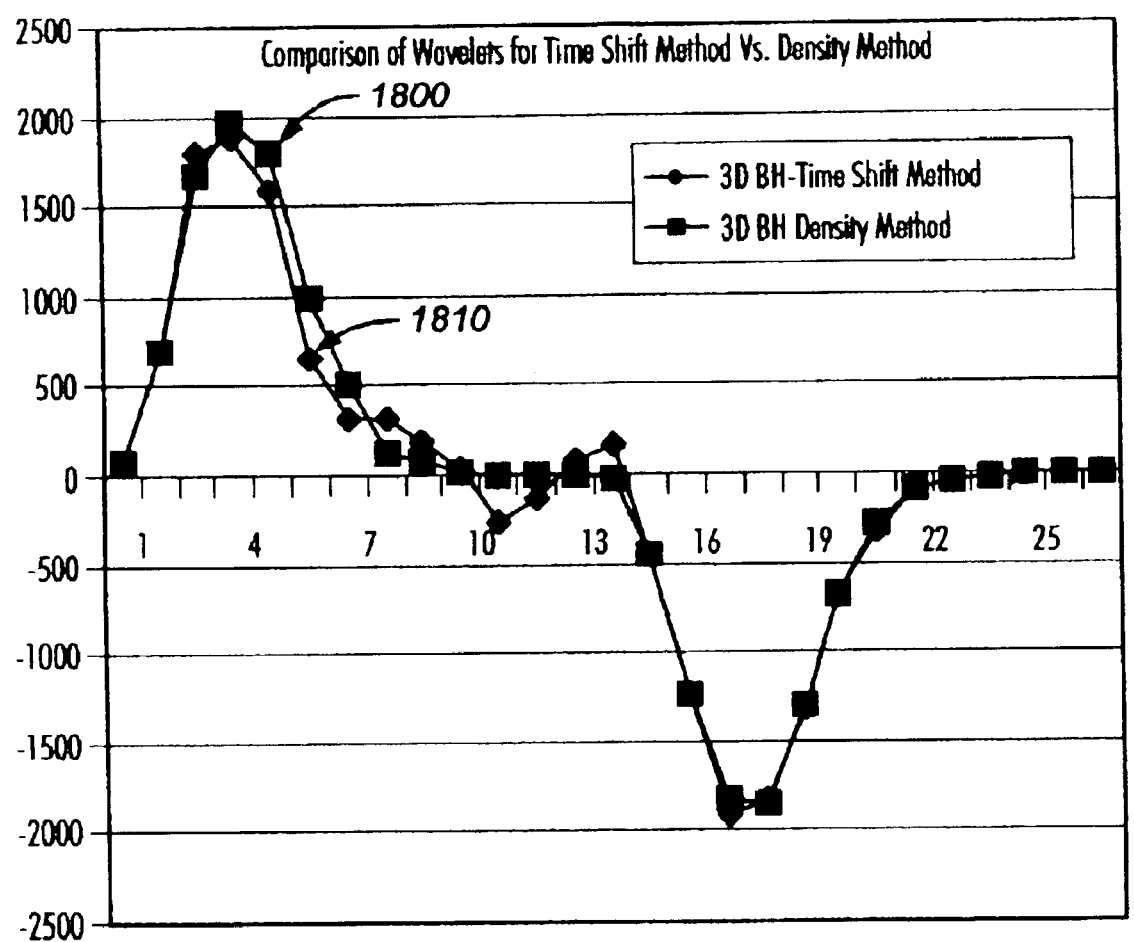
FIG. 18 shows a comparison of Composite Wavelets for a curvilinear borehole modeled by the time shift method and by the pulse density method.
Figure 20A:
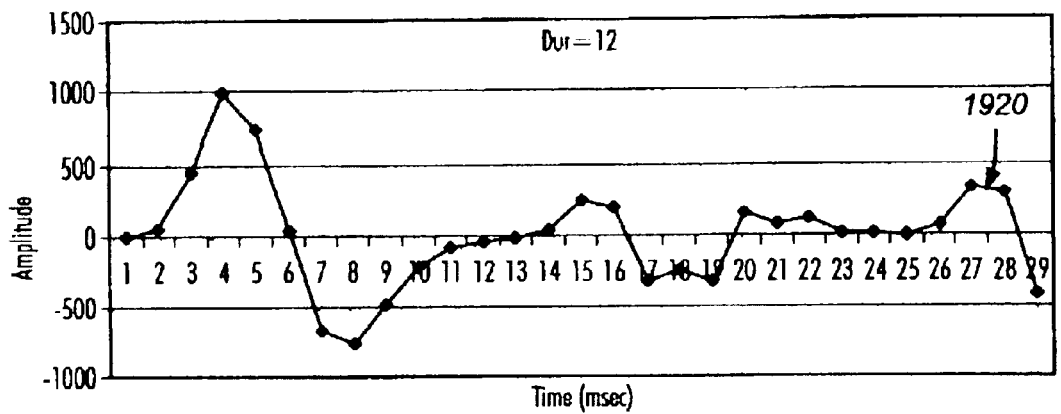
FIG. 20 graphically illustrates the results of the second stage of inversion of a Composite Wavelet modeled using the Pulse Density Method.
Figure 20B:
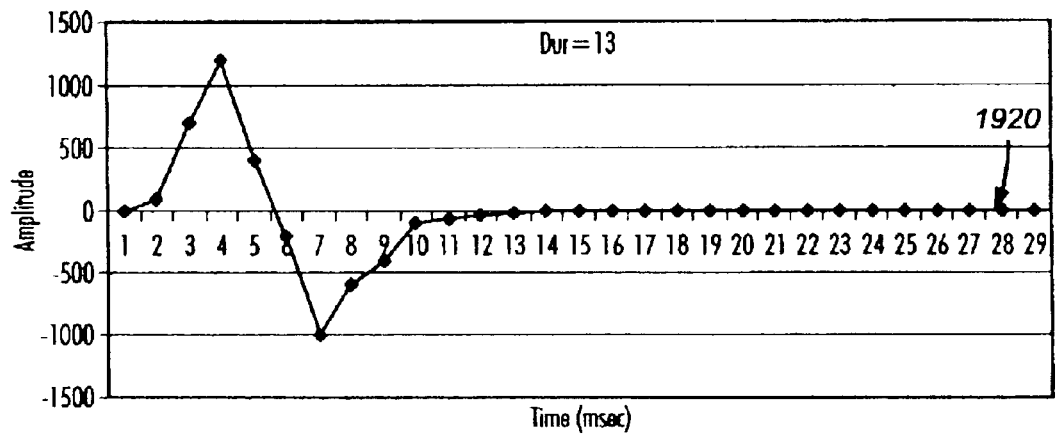
Figure 20C:
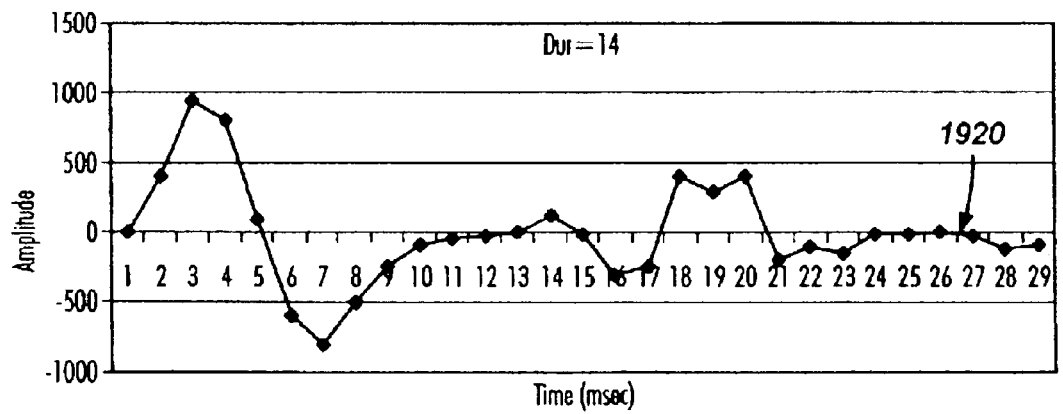
Figure 20D:
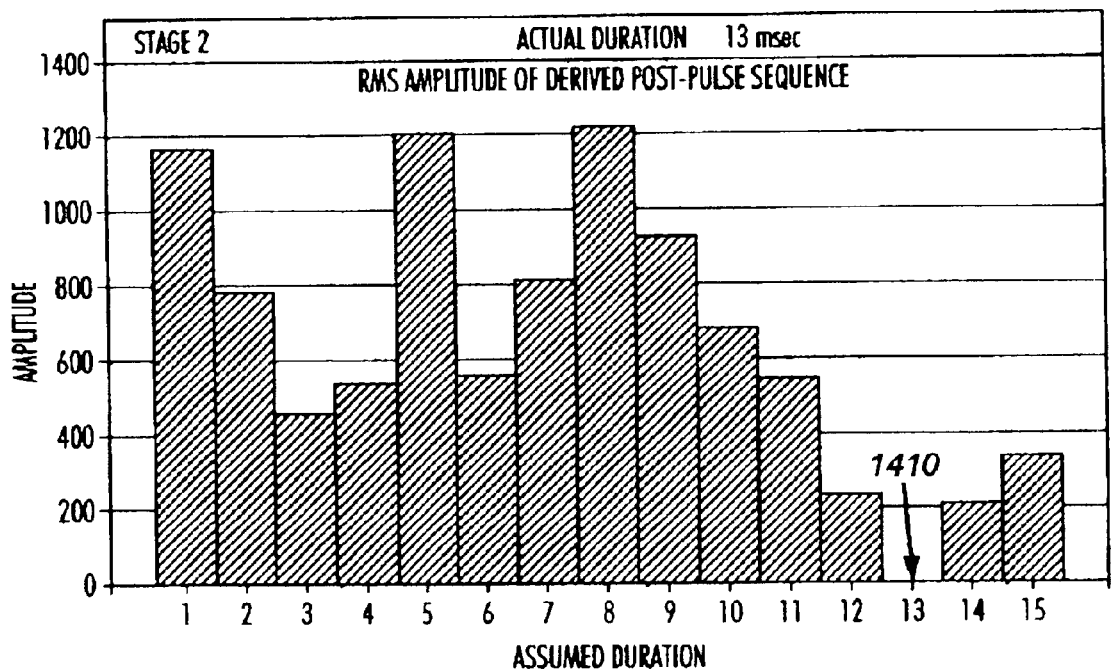
Figure 21A:
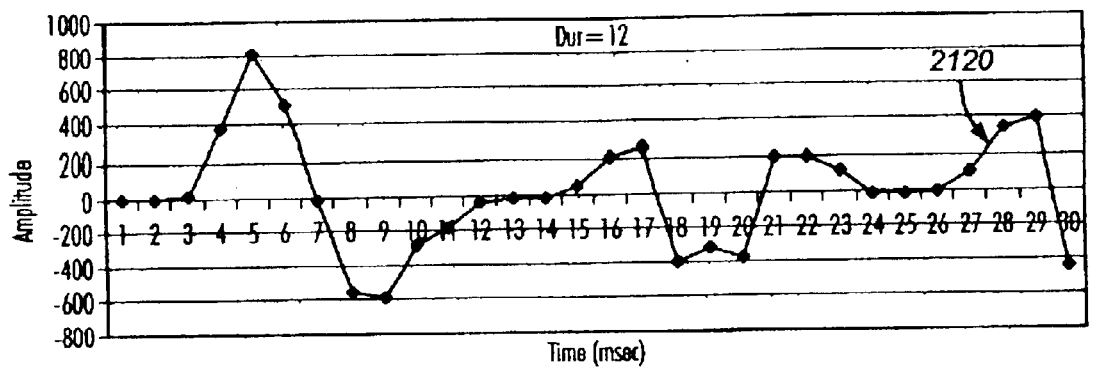
FIG. 21 illustrates the results comparable to FIG. 20 but for a Composite Wavelet modeled using the Time Shift Method FIG. 22 gives sample equations for successive stages of decomposition of a Composite Wavelet.
Figure 21B:
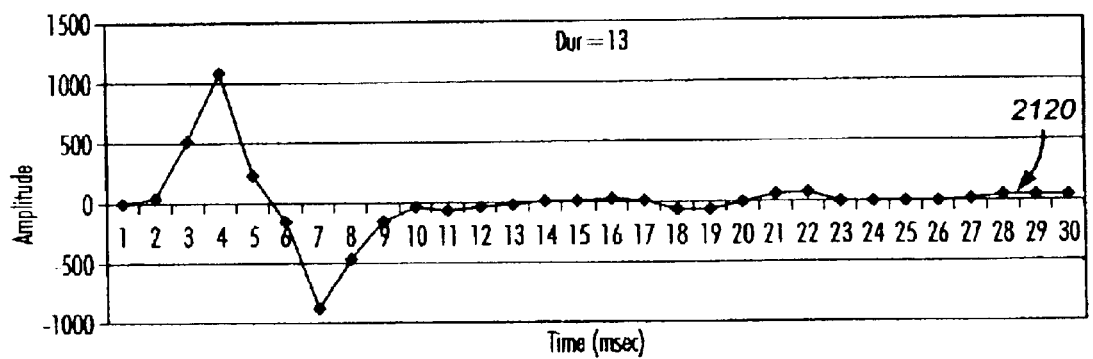
Figure 21C:
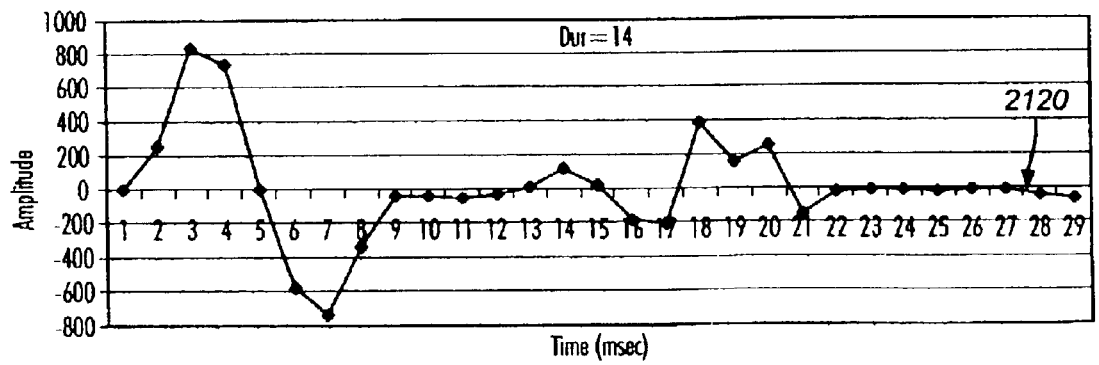
Figure 21D:
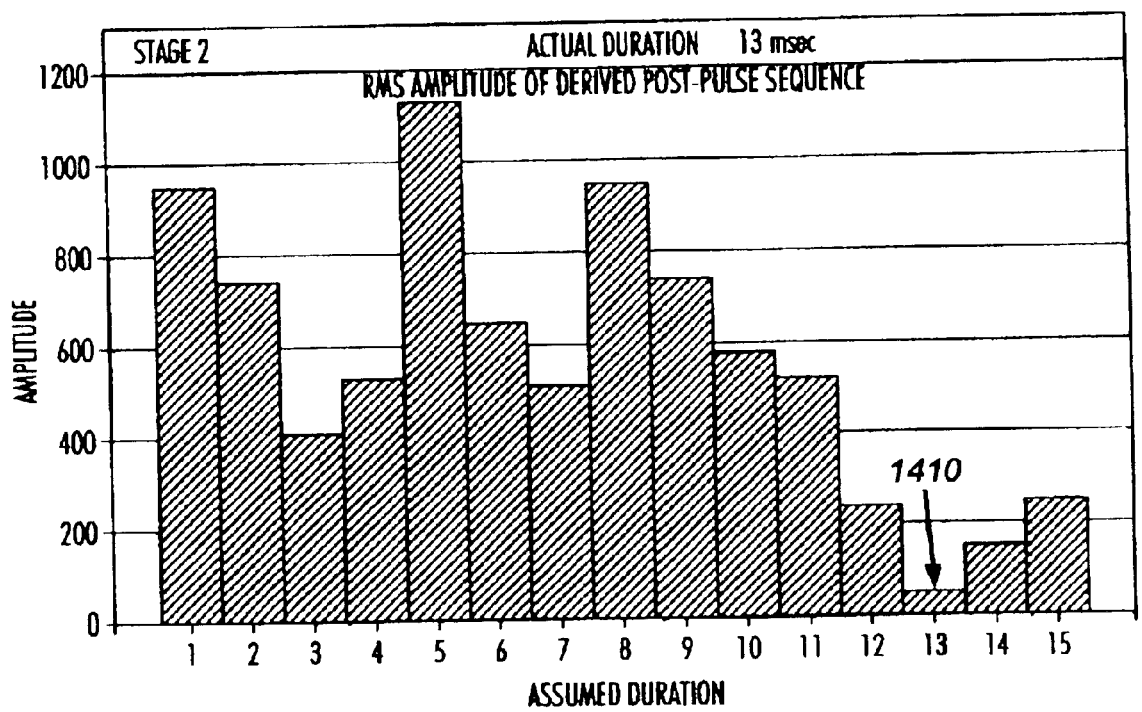

To demonstrate the application of the generalized method to model data, FIG. 18 shows two Composite Wavelets for a curvilinear borehole, calculated using two different methods. The Pulse Density Method yields Composite Wavelet 1800 and a simple time-shift method yields Composite Wavelet 1810. Small differences are observed in the two wavelets and these are due to small errors in the interpolation method used (linear) rather than to any flaw in the Pulse Density general method. These Composite Wavelets were processed through the generalized inversion process based on Equation 4.

The results of Stage 1 of the generalized inversion are shown in FIGS. 19a 19b and 19c. The solution emerges along the solution diagonal 1900. In FIG. 19c the final Stage 1 result appears 1910. The Stage 2 result 1920 appears to the right. These results are graphed in FIG. 20. The Stage 2 result 1920 perfectly reproduces the model wavelet used to build the Composite Wavelet that was input to the inversion process. The correct value of Duration, 13 msec, yields the lowest RMS Amplitude value 1410 as observed on the graph, confirming the choice one would make from comparing the Basic Wavelets calculated for assumed Duration values of 12, 13 and 14 msec.

The calculations of FIG. 19 and the results shown in FIG. 20 are obtained from the input Composite Wavelet 1800 formed using the Pulse Density method to simulate the wavelet that would be recorded in the real case. FIG. 21 shows the inversion results from the time-shift Composite Wavelet 1810 and using the same generalized inversion method as illustrated in FIG. 19 and FIG. 20.

The resultant Basic Wavelet 2120 shows nearly identical form to Basic Wavelet 1920, but with small tail amplitudes instead of zeroes. A sharp minimum in RMS Amplitude is in evidence at the correct Duration, 13 msec. Thus the generalized inversion method works well on the Composite Wavelet generated using a different set of assumptions than the inversion method itself.

An alternate method of performing the inversion processing is to bypass the Stage 1 inversion step and perform the Stage 2 inversion on the best estimate of the true Composite Wavelet. The Stage 2 result by itself yields a stable decaying wavelet at the correct Duration, with the difference that the output is not a single Basic Wavelet but the summation of a series of Basic Wavelets over the Duration. The output of the Stage 2 inversion can be subjected to visual and mathematical analysis as previously described to find the best estimate of Duration and extent-of-detonation of the perforating gun. An advantage of this approach is that the Stage 2 inversion may be more robust in the presence of seismic noise than is the Stage 1 inversion. Both approaches may be tried and compared in practice.

Further, in this alternative approach, the Stage 1 inversion may be applied to the Stage 2 output. Thus the order of the stages may be reversed. In the ideal noise-free case the interpreted results would be identical.

Yet another viable model-based method of determining the extent-of-detonation is to compute synthetic Composite Wavelets such as illustrated in FIG. 11 and to compute best fit to the real Composite Wavelet estimate. An assumed Basic Wavelet can be summed repetitively with appropriate time delays for the physical environment and position of the perforating gun. The assumed Basic Wavelet may be judiciously chosen from actual recorded prior detonations under similar conditions, obtained from inversion according to the present invention from prior detonations, or otherwise provided. Various assumptions of extent-of-detonation can be used to compute corresponding synthetic Composite Wavelets. The synthetic Composite Wavelets are then compared to the real Composite Wavelet (best estimate of true Composite Wavelet). The method of comparison can be variously chosen ranging from visual comparison, differencing, power calculations, Least-Mean-Square Error (LSME) fit measurement, spectral fit and other methods.

Other mathematical methods of performing the generalized inversion may be substituted by those skilled in the mathematical arts.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A method of ascertaining whether an attempted detonation of a perforating gun in a borehole was successful, said method comprising the steps of:
   (a) positioning seismic wave sensors at selected locations in relative proximity to a perforating gun in a borehole;
   (b) initiating detonation of said perforating gun;
   (c) sensing, recording and analyzing seismic waves traveling through the earth from the location of said borehole to the positions of the seismic sensors; and,
   (d) comparing an analysis of said seismic waves to predetermined potentials from said perforating gun.

2. The method of claim 1 wherein said seismic waves are subjected to mathematical processing beneficial to the analysis of said seismic waves.

3. The method of claim 2 wherein said mathematical processing includes processing of sensor signals and combining the processed sensor signals.

4. The method of claim 2 wherein said mathematical processing includes time shifting of individual sensor signals and combining the time-shifted sensor signals.

5. The method of claim 2 wherein said mathematical processing includes filtering of the individual sensor signals and combination of these filtered signals.

6. The method of claim 2 wherein said mathematical processing includes noise editing and scaling followed by combination of the individual sensor signals.

7. The method of claim 1 wherein said sensing of said seismic waves is followed by a process of combining of individual sensor signals.

8. The method of claim 1 wherein said selected locations are chosen to render more effective said analysis of seismic waves.

9. The method of claim 8 in which said preferred locations are chosen to increase the duration of the seismic waves that directly arrive to said sensors from said perforating gun.

10. The method of claim 8 in which said preferred locations are chosen to increase the separation in time between seismic waves that directly arrive to said sensors from said perforating gun and said seismic waves that arrive by diverse paths that are not direct.

11. The method of claim 1 in which said seismic wave sensors are geophones.

12. The method of claim 1 in which said seismic wave sensors are hydrophones.

13. The method of claim 1 wherein said seismic wave sensors are at or near the surface of the earth.

14. The method of claim 1 wherein said seismic wave sensors are positioned to form one or more one-dimensional arrays.

15. The method of claim 1 wherein said seismic wave sensors are positioned to form one or more two-dimensional arrays.

16. The method of claim 1 wherein said seismic wave sensors are positioned to form one or more three-dimensional arrays.

17. The method of claim 1 wherein said seismic sensors are within a borehole.

18. The method of claim 1 wherein said analyzing and said comparing yields a determination of whether said perforating gun detonated or failed to detonate.

19. The method of claim 1 wherein said analyzing and said comparing yield a determination of a partial misfire of said perforating gun.

20. The method of claim 1 wherein said analyzing and said comparing yields a quantified estimate of the extent-of-detonation of said perforating gun.

21. The method of claim 20 in which said quantified estimate is determined by comparison to modeled composite seismic wavelets.

22. The method of claim 21 in which said modeled composite seismic wavelets are computed at least in part from observed seismic wavelets obtained from prior perforating gun detonations.

23. The method of claim 21 in which said modeled composite seismic wavelets are not computed from observed seismic wavelets.

24. The method of claim 21 in which said modeled composite seismic wavelets are computed using a pulse density method that accounts for predicted seismic travel time, and also accounts for three-dimensional geometry, variable detonation velocity and charge distribution of said perforating gun.

25. The method of claim 20 in which said comparing to modeled composite seismic wavelets is done by a best-fit method.

26. The method of claim 20 in which interpolation between models is used to more accurately quantify said quantified estimate.

27. The method of claim 20 in which said quantified estimate is determined from analysis of the results of one or more mathematical inversion processes.

28. The method of claim 27 in which a single inversion process is applied.

29. The method of claim 28 in which said single inversion process is applied multiple times with varying assumptions of duration of the composite seismic wavelet.

30. The method of method of claim 27 which two or more inversion processes are applied sequentially.

31. The method of claim 30 in which the given sequence of inversion processes is applied multiple times with varying assumptions of duration of the composite seismic wavelet.

32. The method of claim 27 in which analysis of the residual energy in the inversion outputs aids the determination of said extent-of-detonation of said perforating gun.

33. The method of claim 27 in which a pulse density method, that accounts for predicted seismic travel time, and also accounts for three-dimensional geometry, variable detonation velocity and charge distribution of the perforating gun, is used in at least one of said mathematical inversion processes.

34. The method of claim 20 in which said analyzing or said comparing includes the use of amplitude measurements derived from said seismic waves.

35. The method of claim 20 in which said analyzing or said comparing includes the use of wavelet shape information derived from said seismic waves.

36. A method of acquiring vertical seismic profiling information, said method comprising the steps of:
   (a) determining the discharge characteristics of a perforating gun;
   (b) positioning said perforating gun in a borehole at a selected depth;
   (c) positioning seismic wave sensors at selected locations in relative proximity to a perforating gun in a borehole;

(d) using a detonation controller to initiate detonation of said perforating gun;

(e) using a second controller for sensing, recording and analyzing seismic waves traveling through the earth from the location of said perforating gun to the positions of said seismic wave sensor; and, (f) comparing characteristics of said recorded and analyzed seismic waves to said predetermined potentials from said perforating gun.

37. The method of claim 36 in which the detonation controller is directly linked to the extent-of-detonation controller to communicate about the time of detonation.

38. The method of claim 36 in which the detonation controller is not directly linked to the second controller at the time of detonation and in which both controllers utilize independent clocks to allow determination of time of detonation.

39. The method of claim 36 in which the detonation controller is not directly linked to the second controller at the time of detonation and in which one or both controllers utilize external time signals to allow determination of the time of detonation.

40. A system utilizing seismic waves, suitable for determination of whether a perforating gun in a borehole successfully detonated, comprising a detonation controller that provides means of initiating detonation of said perforating gun, one or more seismic wave sensors positioned at preferred locations in relative proximity to said perforating gun, a signal recorder, an extent-of-detonation system controller, and a means for analyzing and comparing said seismic waves to pre-determined potentials from said perforating gun.

41. The system of claim 40 with means also provided to combine individual seismic wave sensor signals.

42. The system of claim 40 wherein signals corresponding to said seismic waves are input to a processor that mathematically processes them to benefit a comparison to said pre-determined potentials from said perforating gun.

43. The system of claim 42 in which the mathematical processing includes the combining of said signals.

44. The system of claim 40 in which said detonation controller and said perforating gun is not linked to any other component of the system.

45. The system of claim 40 which also includes means to choose said preferred locations to increase the duration of seismic waves that directly arrive to said sensors from said perforating gun.

46. The system of claim 40 in which also includes means to choose said preferred locations to increase the separation in time between seismic waves that directly arrive to said sensors from said perforating gun and seismic waves that arrive by diverse paths that are not direct.

47. The system of claim 40 in which said seismic wave sensors are geophones.

48. The system of claim 40 in which said seismic wave sensors are hydrophones.

49. The system of claim 40 wherein said seismic wave sensors are at or near the surface of the earth.

50. The system of claim 40 wherein said seismic wave sensors are positioned to form one or more one-dimensional arrays.

51. The system of claim 40 wherein said seismic wave sensors are positioned to form one or more two-dimensional arrays.

52. The system of claim 40 wherein said seismic wave sensors are positioned to form one or more three-dimensional arrays.

53. The system of claim 40 wherein said seismic wave sensors are positioned within a borehole.

54. The system of claim 40 wherein said analyzing and said comparing yield a determination of whether said perforating gun detonated or failed to detonate.

55. The system of claim 40 wherein said analyzing and said comparing yield a determination of a partial misfire of said perforating gun.

56. The system of claim 40 wherein said analyzing and said comparing yield a quantified estimate of the extent-of-detonation of said perforating gun.

57. The system of claim 56 in which said quantified estimate is determined by comparison to modeled composite seismic wavelets.

58. The system of claim 57 in which said modeled composite seismic wavelets are computed at least in part from observed seismic wavelets obtained from prior perforating gun detonations.

59. The system of claim 57 which said modeled composite seismic wavelets are not computed from observed seismic wavelets.

60. The system of claim 57 in which said modeled composite seismic wavelets are computed using a pulse density method that accounts for predicted seismic travel time, and also accounts for three-dimensional geometry, variable detonation velocity and charge distribution of the perforating gun.

61. The system of claim 56 in which said comparing to modeled composite seismic wavelets is done by a best-fit method.

62. The system of claim 56 in which interpolation between models is used to more accurately quantify said quantified estimate.

63. The system of claim 56 in which said quantified estimate is obtained from analysis of the results of one or more mathematical inversion processes.

64. The system of claim 63 in which a single inversion process is applied.

65. The system of claim 64 in which a single inversion process is applied multiple times with varying assumption of duration of the composite seismic wavelet.

66. The system of claim 63 in which two or more inversion processes are applied sequentially.

67. The system of claim 66 in which the given sequence of inversion processes is applied multiple times with varying assumptions of duration of the composite seismic wavelet.

68. The system of claim 63 in which analysis of the residual energy in the inversion outputs aids the determination of said extent-of-detonation of said perforating gun.

69. The system of claim 63 in which a pulse density method, that accounts for predicted seismic travel time, and also accounts for three-dimensional geometry, variable detonation velocity and charge distribution of the perforating gun, is used in at least one of said mathematical inversion processes.

70. The system of claim 56 in which said analyzing or said comparing includes the use of amplitude measurements derived from said seismic waves.

71. The system of claim 56 in which said analyzing or said comparing includes the use of wavelet shape information derived from said seismic waves.

72. A system for acquiring vertical seismic profiling information, said system including means for:

(a) positioning of seismic wave sensors at a selected locations in relative proximity to a perforating gun in a borehole, (b) using a detonation controller having a first independent clock to initiate detonation of said perforating gun;

(c) using a second controller having a second independent clock that has been synchronized to said first independent clock, to sense and record signals from seismic waves traveling through the earth from the location of said perforating gun to the positions of said seismic wave sensors; and (d) the detonation of said perforating gun being coordinated by said first independent clock.

73. The system of claim 72 in which said detonation controller is directly linked to said second controller.

74. The system of claim 72 in which the detonation controller is not directly linked to the second controller.

75. The system of claim 72 in which the detonation controller is not directly linked to the second controller at the time of detonation and in which one or both of the controllers utilize external time signals to allow determination of the time of detonation.

* * * * *